(12) United States Patent
Schank et al.

(10) Patent No.: US 11,235,858 B2
(45) Date of Patent: Feb. 1, 2022

(54) BLADE FOLD MECHANISM

(71) Applicant: Bell Helicopter Textron Inc., Fort Worth, TX (US)

(72) Inventors: Troy Cyril Schank, Keller, TX (US); Andrew Ryan Maresh, Lewisville, TX (US); Chyau-Song Tzeng, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 835 days.

(21) Appl. No.: 16/035,397

(22) Filed: Jul. 13, 2018

(65) Prior Publication Data

US 2019/0016441 A1 Jan. 17, 2019

Related U.S. Application Data

(63) Continuation-in-part of application No. 15/428,687, filed on Feb. 9, 2017, now Pat. No. 10,526,068, which is a continuation-in-part of application No. 14/957,321, filed on Dec. 2, 2015, now Pat. No. 10,336,447.

(60) Provisional application No. 62/086,637, filed on Dec. 2, 2014.

(51) Int. Cl.
*B64C 27/50* (2006.01)
*B64C 11/28* (2006.01)
*B64C 29/00* (2006.01)
*B64C 27/30* (2006.01)
*B64C 11/32* (2006.01)

(52) U.S. Cl.
CPC .............. *B64C 11/28* (2013.01); *B64C 11/32* (2013.01); *B64C 27/30* (2013.01); *B64C 29/0033* (2013.01)

(58) Field of Classification Search
CPC .......... B64C 11/28; B64C 11/32; B64C 27/30
See application file for complete search history.

(56) References Cited

U.S. PATENT DOCUMENTS

| 3,101,785 | A | * | 8/1963 | Leoni | ...................... B64C 27/50 |
| | | | | | 416/143 |
| 3,515,500 | A | | 6/1970 | Nachod | |
| 3,528,630 | A | | 9/1970 | Ferris et al. | |
| 3,592,412 | A | | 7/1971 | Glatfelter | |
| 3,764,229 | A | | 10/1973 | Ferris et al. | |
| 3,771,924 | A | | 11/1973 | Buchstaller | |

(Continued)

OTHER PUBLICATIONS

European Search Report in related European Application No. 18154237.4 dated May 9, 2018; 4 pages.

(Continued)

*Primary Examiner* — Kayla McCaffrey
(74) *Attorney, Agent, or Firm* — Lightfoot & Alford PLLC

(57) ABSTRACT

A mechanism for folding a rotor blade that is rotatably coupled to a blade cuff about a blade-fold axis between an extended position and a folded position. The mechanism includes a swash plate configured to translate relative to a mast, a pitch link rotatably coupled to the swash plate, a pitch horn rotatably coupled to the pitch link, a crank coupled to the pitch horn, and a link rotatably coupled to the crank and rotatably coupled to the rotor blade. The pitch horn and the crank being configured to commonly rotate relative to the blade cuff about a crank axis in response to translation of the swash plate, wherein the crank axis passes through the blade cuff.

17 Claims, 21 Drawing Sheets

(56) References Cited

U.S. PATENT DOCUMENTS

| | | |
|---|---|---|
| 3,874,817 A | 4/1975 | Ferris |
| 4,436,483 A | 3/1984 | Watson |
| 5,085,315 A * | 2/1992 | Sambell .................. B64C 27/30 244/17.25 |
| 6,622,962 B1 | 9/2003 | White |
| 6,824,096 B2 | 11/2004 | Zoppitelli et al. |
| 7,037,072 B2 | 5/2006 | Carson |
| 7,695,249 B2 | 4/2010 | Krauss et al. |
| 8,376,264 B1 | 2/2013 | Hong et al. |
| 8,998,125 B2 | 4/2015 | Hollimon et al. |
| 2006/0067822 A1 | 3/2006 | D'Anna |
| 2008/0112808 A1 | 5/2008 | Schmaling et al. |
| 2016/0083087 A1 | 3/2016 | Schank et al. |
| 2016/0152329 A1 | 6/2016 | Tzeng et al. |
| 2017/0144746 A1 | 5/2017 | Schank et al. |

OTHER PUBLICATIONS

European Exam Report in related European Application No. 18154237.4 dated May 28, 2018; 6 pages.

* cited by examiner

BLADE FOLD MECHANISM

CROSS-REFERENCE TO RELATED APPLICATIONS

The present application is a continuation-in-part of U.S. patent application Ser. No. 15/428,687, filed Feb. 9, 2017; which is a continuation-in-part of U.S. patent application Ser. No. 14/957,321, filed Dec. 2, 2015; and claims the benefit of Provisional Application No. 62/086,637, filed Dec. 2, 2014; all of which are incorporated by reference herein in their entireties.

TECHNICAL FIELD OF THE DISCLOSURE

The present disclosure relates, in general, to tiltrotor aircraft operable for vertical takeoff and landing in a helicopter flight mode and high-speed forward cruising in an airplane flight mode and, in particular, to tiltrotor aircraft operable for transitions between rotary and non-rotary flight modes.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that creates a pressure differential above and below the wing, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by utilizing proprotors that can change their plane of rotation based on the operation being performed. Tiltrotor aircraft typically have a pair of nacelles mounted near the outboard ends of a fixed wing with each nacelle housing a propulsion system that provides torque and rotational energy to a proprotor. The nacelles are rotatable relative to the fixed wing such that the proprotors have a generally horizontal plane of rotation providing vertical thrust for takeoff, hovering and landing, much like a conventional helicopter, and a generally vertical plane of rotation providing forward thrust for cruising in forward flight with the fixed wing providing lift, much like a conventional propeller driven airplane. It has been found, however, that forward airspeed induced proprotor aeroelastic instability is a limiting factor relating to the maximum airspeed of tiltrotor aircraft in forward flight.

SUMMARY

In a first aspect, the present disclosure is directed to a mechanism for transitioning a tiltrotor aircraft between rotary and non-rotary flight modes. The aircraft includes a mast and a rotor assembly having a gimballing degree of freedom relative to the mast in the rotary flight mode. The rotor assembly includes a plurality of rotor blade assemblies each having a pitching degree of freedom in the rotary flight mode and a folding degree of freedom in the non-rotary flight mode. The transitioning mechanism includes a gimbal lock positioned about the mast. The gimbal lock has a disengaged position relative to the rotor assembly enabling the gimballing degree of freedom and an engaged position relative to the rotor assembly disabling the gimballing degree of freedom. A blade stop assembly is positioned about the mast. The blade stop assembly includes a plurality of arms having a radially contracted orientation in the rotary flight mode and a radially extended orientation in the non-rotary flight mode. A swash plate is positioned about and is operable to rise and fall relative to the mast. The swash plate is operable to change the pitch of the rotor blade assemblies in the rotary flight mode and operable to fold the rotor blade assemblies in the non-rotary flight mode. A blade lock assembly is operably associated with each of the rotor blade assemblies. Each blade lock assembly has a first position disabling the folding degree of freedom and enabling the pitching degree of freedom of the respective rotor blade assembly and a second position enabling the folding degree of freedom and disabling the pitching degree of freedom of the respective rotor blade assembly.

In certain embodiments, the aircraft is in the rotary flight mode when the gimbal lock is in the disengaged position, the arms of the blade stop assembly are in the radially contracted orientation and each of the blade lock assemblies is in the first position. In such embodiments, the aircraft is in the non-rotary flight mode when the gimbal lock is in the engaged position, the arms of the blade stop assembly are in the radially extended orientation and each of the blade lock assemblies is in the second position. In some embodiments, the gimbal lock may include a conical ring that engages the rotor assembly to disable the gimballing degree of freedom. The gimbal lock may also include an actuator operably associated with the conical ring to raise and lower the conical ring relative to the mast to transition the gimbal lock between the engaged and disengaged positions. In this embodiment, the actuator may include an actuation ring positioned about the mast that is operable to raise and lower the conical ring relative to the mast. In certain embodiments, the blade stop assembly may include an actuator operably associated with the arms to transition the arms between the radially contracted orientation and the radially extended orientation. The actuator may include an actuation ring positioned about the mast that is operable to transition the arms between the radially contracted orientation and the radially extended orientation. In some embodiments, a single actuator may be common to the gimbal lock and the blade stop assembly such that the gimbal lock transitions between the disengaged and engaged positions as the arms of the blade stop assembly transition between the radial retracted and radially extended orientations.

In certain embodiments, each rotor blade assembly may include a cuff and a rotor blade pivotably coupled to the cuff such that the swash plate may be coupled to each cuff by a pitch link and a pitch horn. In such embodiments, the rise and fall of the swash plate, in the rotary flight mode, changes the pitch of the rotor blade assemblies and the rise and fall of the swash plate, in the non-rotary flight mode, folds the rotor blades relative to the cuffs. In some embodiments, each blade lock assembly may include a crank and a link coupled at a pivot joint. In such embodiments, each link may be rotatably coupled to the respective rotor blade and each crank may be rotatably coupled to the respective cuff such that each crank is operable to rotate relative to the respective cuff responsive to rise and fall of the swash plate in the non-rotary flight mode. Each blade lock assembly may also include a blade lock having a fold lock position securing the pivot joint to the respective cuff and a pitch lock position securing the respective cuff to the respective arm of the blade stop assembly. In certain embodiments, an actuator may be operably coupled to each blade lock and operable to shift the respective blade lock between the fold lock position and the pitch lock position. In some embodiments, each blade lock may include a pitch lock and a fold lock, wherein the pitch lock is rotatably coupled to the respective cuff at an inboard location and the fold lock is rotatably coupled to the respective cuff outboard of the pitch lock. In such embodiments, each fold lock disables the folding degree of freedom of the respective rotor blade assembly, in the rotary flight mode and enables the folding degree of freedom of the respective rotor blade assembly, in the non-rotary flight mode while each pitch lock disables the pitching degree of freedom of the respective rotor blade assembly, in the non-rotary flight mode and enables the pitching degree of freedom of the respective rotor blade assembly, in the rotary flight mode.

In a second aspect, the present disclosure is directed to a tiltrotor aircraft having rotary and non-rotary flight modes. The aircraft includes a mast and a rotor assembly having a gimballing degree of freedom relative to the mast in the rotary flight mode. The rotor assembly includes a plurality of rotor blade assemblies each having a pitching degree of freedom in the rotary flight mode and a folding degree of freedom in the non-rotary flight mode. A gimbal lock is positioned about the mast. The gimbal lock has a disengaged position relative to the rotor assembly enabling the gimballing degree of freedom and an engaged position relative to the rotor assembly disabling the gimballing degree of freedom. A blade stop assembly is positioned about the mast. The blade stop assembly includes a plurality of arms having a radially contracted orientation in the rotary flight mode and a radially extended orientation in the non-rotary flight mode. A swash plate is positioned about and is operable to rise and fall relative to the mast. The swash plate is operable to change the pitch of the rotor blade assemblies in the rotary flight mode and operable to fold the rotor blade assemblies in the non-rotary flight mode. A blade lock assembly is operably associated with each of the rotor blade assemblies. Each blade lock assembly has a first position disabling the folding degree of freedom and enabling the pitching degree of freedom of the respective rotor blade assembly and a second position enabling the folding degree of freedom and disabling the pitching degree of freedom of the respective rotor blade assembly.

In certain embodiments, the aircraft may include one or more engines having a turboshaft mode corresponding to the rotary flight mode of the aircraft and a turbofan mode corresponding to the non-rotary flight mode of the aircraft, wherein the engine provides torque and rotational energy to the mast in the turboshaft mode and provides no torque and rotational energy to the mast in the turbofan mode. In some embodiments, the maximum forward airspeed of the aircraft in an airplane forward flight mode exceeds the maximum forward airspeed of that aircraft when it is limited by proprotor aeroelastic instability in a proprotor forward flight mode.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, as used herein, the term "coupled" may include direct or indirect coupling by any means, including moving and/or non-moving mechanical connections.

Figure 1A:
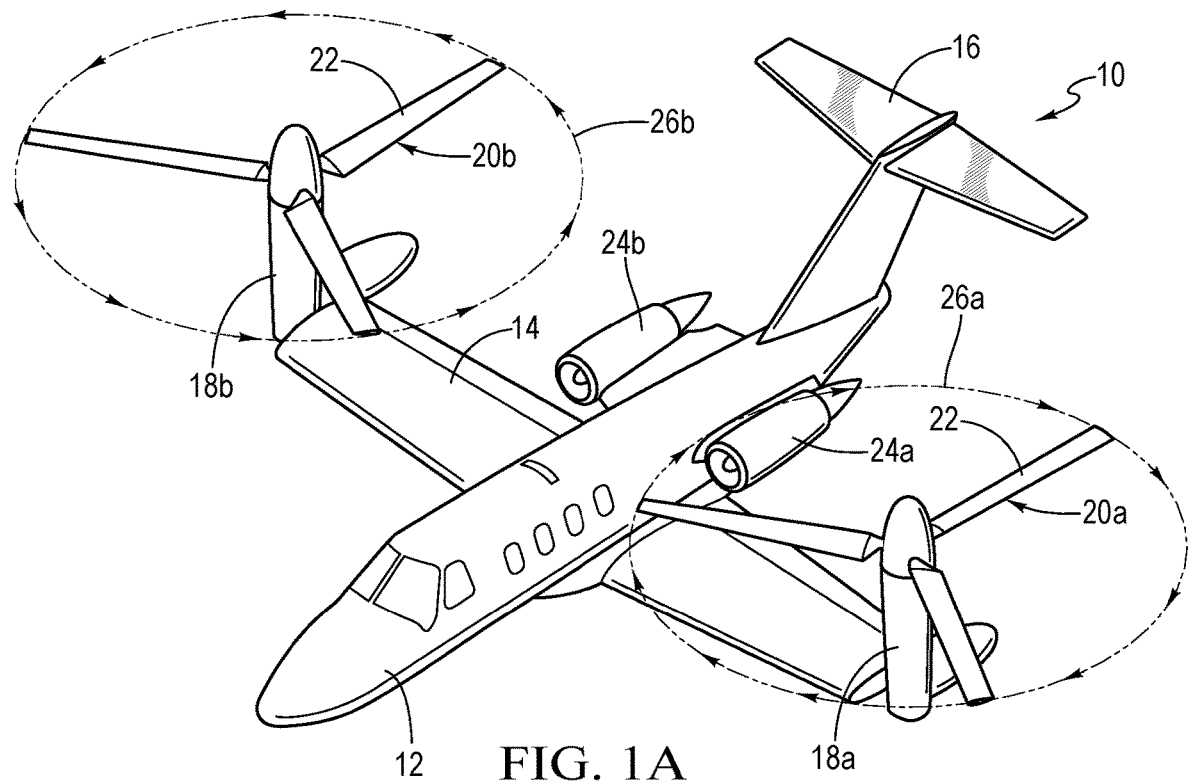
FIGS. 1A-1D are schematic illustrations of a tiltrotor aircraft in various flight modes in accordance with embodiments of the present disclosure.
Figure 1B:
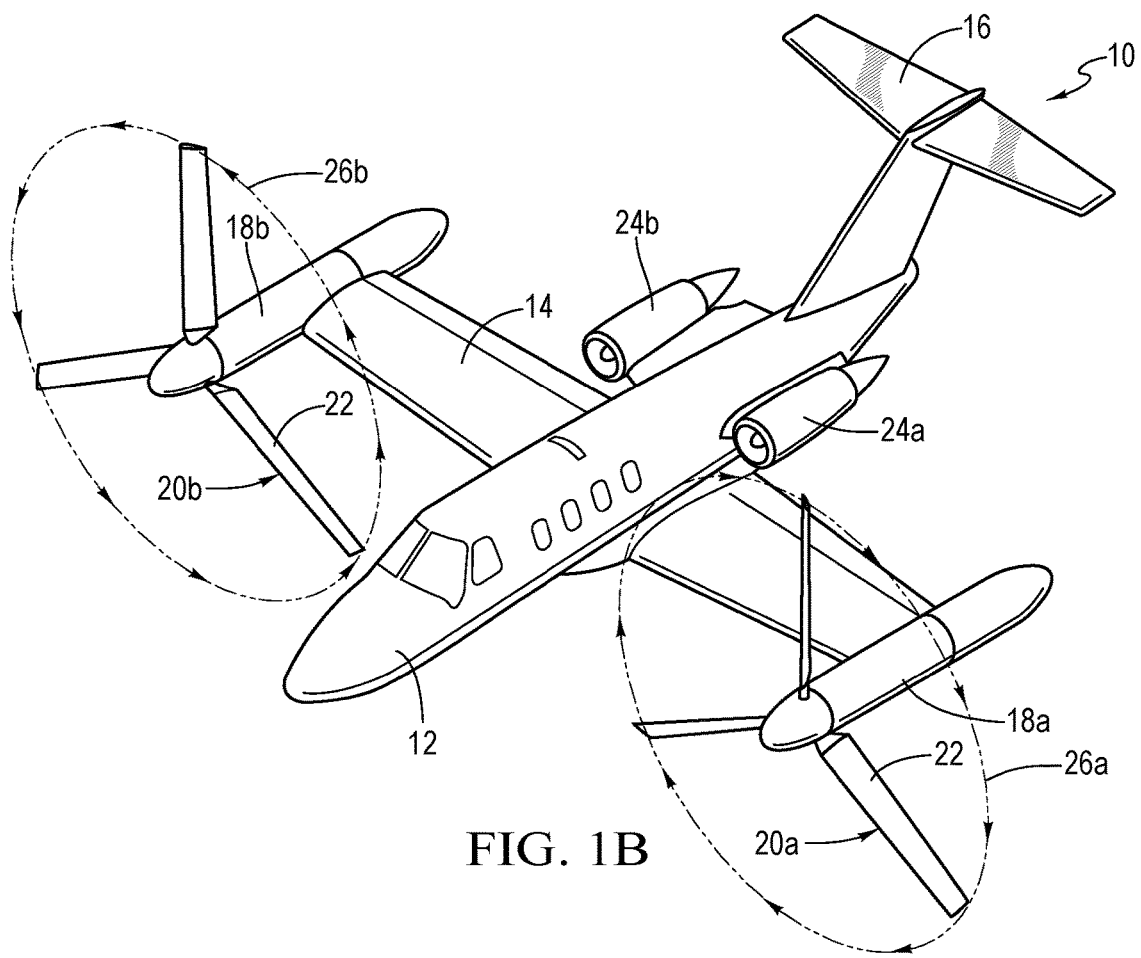
Figure 1C:
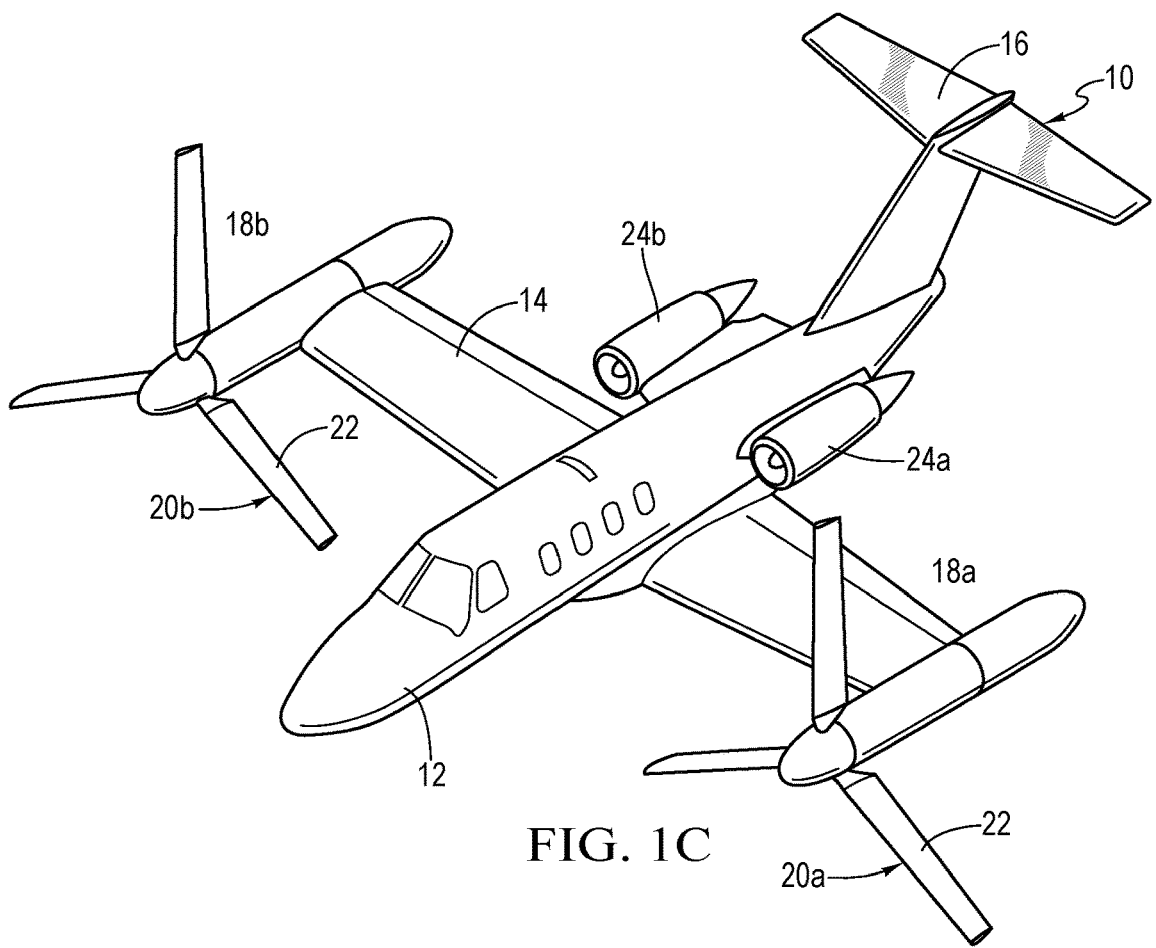
Figure 1D:
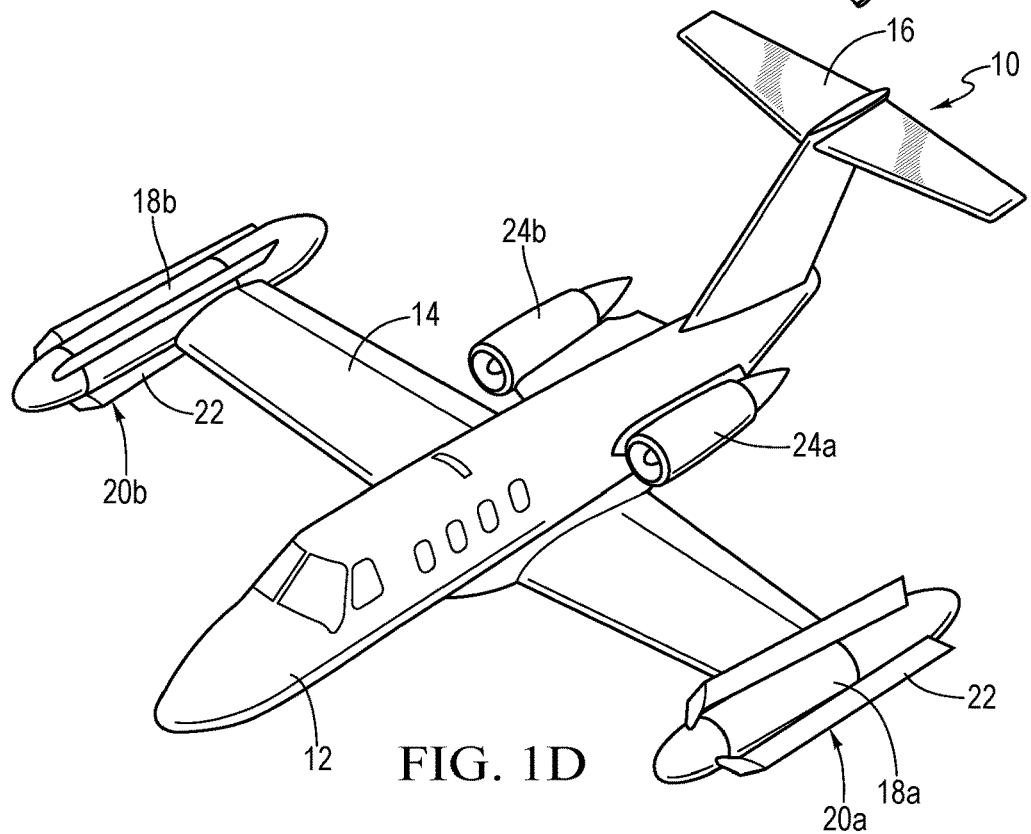

Referring to FIGS. 1A-1D in the drawings, a tiltrotor aircraft is schematically illustrated and generally designated 10. Tiltrotor aircraft 10 includes a fuselage 12, a wing 14 and a tail assembly 16 including control surfaces operable for horizontal and/or vertical stabilization during forward flight. Located proximate the outboard ends of wing 14 are pylon assemblies 18a, 18b that are rotatable relative to wing 14 between a generally vertical orientation, as best seen in FIG. 1A, and a generally horizontal orientation, as best seen in FIGS. 1B-1D. Pylon assemblies 18a, 18b each house a portion of the drive system that is used to rotate proprotor assemblies 20a, 20b, respectively. Each proprotor assembly 20a, 20b includes a plurality of proprotor blades 22 that are operable to be rotated, as best seen in FIGS. 1A-1B, operable to be feathered, as best seen in FIG. 1C and operable to be folded, as best seen in FIG. 1D. In the illustrated embodiment, proprotor assembly 20a is rotated responsive to torque and rotational energy provided by engine 24a and proprotor assembly 20b is rotated responsive to torque and rotational energy provided by engine 24b. Engines 24a, 24b are located proximate an aft portion of fuselage 12. Engines 24a, 24b are operable in a turboshaft mode, as best seen in FIGS. 1A-1B and a turbofan mode, as best seen in FIGS. 1C-1D.

FIG. 1A illustrates tiltrotor aircraft 10 in VTOL or helicopter flight mode, in which proprotor assemblies 20a, 20b are rotating in a substantially horizontal plane to provide a lifting thrust, such that tiltrotor aircraft 10 flies much like a conventional helicopter. In this configuration, engines 24a, 24b are operable in turboshaft mode wherein hot combustion gases in each engine 24a, 24b cause rotation of a power turbine coupled to an output shaft that is used to power the drive system coupled to the respective proprotor assemblies 20a, 20b. Thus, in this configuration, tiltrotor aircraft 10 is considered to be in a rotary flight mode. FIG. 1B illustrates tiltrotor aircraft 10 in proprotor forward flight mode, in which proprotor assemblies 20a, 20b are rotating in a substantially vertical plane to provide a forward thrust enabling wing 14 to provide a lifting force responsive to forward airspeed, such that tiltrotor aircraft 10 flies much like a conventional propeller driven aircraft. In this configuration, engines 24a, 24b are operable in the turboshaft mode and tiltrotor aircraft 10 is considered to be in the rotary flight mode.

In the rotary flight mode of tiltrotor aircraft 10, proprotor assemblies 20a, 20b rotate in opposite directions to provide torque balancing to tiltrotor aircraft 10. For example, when viewed from the front of tiltrotor aircraft 10 in proprotor forward flight mode (FIG. 1B) or from the top in helicopter mode (FIG. 1A), proprotor assembly 20a rotates clockwise, as indicated by motion arrows 26a, and proprotor assembly 20b rotates counterclockwise, as indicated by motion arrows 26b. In the illustrated embodiment, proprotor assemblies 20a, 20b each include three proprotor blades 22 that are equally spaced apart circumferentially at approximately 120-degree intervals. It should be understood by those having ordinary skill in the art, however, that the proprotor assemblies of the present disclosure could have proprotor blades with other designs and other configurations including proprotor assemblies having four, five or more proprotor blades. In addition, it should be appreciated that tiltrotor aircraft 10 can be operated such that proprotor assemblies 20a, 20b are selectively positioned between proprotor forward flight mode and helicopter mode, which can be referred to as a conversion flight mode.

FIG. 1C illustrates tiltrotor aircraft 10 in transition between proprotor forward flight mode and airplane forward flight mode, in which engines 24a, 24b have been disengaged from proprotor assemblies 20a, 20b and proprotor blades 22 of proprotor assemblies 20a, 20b have been feathered, or oriented to be streamlined in the direction of flight, such that proprotor blades 22 act as brakes to aerodynamically stop the rotation of proprotor assemblies 20a, 20b. In this configuration, engines 24a, 24b are operable in turbofan mode wherein hot combustion gases in each engine 24a, 24b cause rotation of a power turbine coupled to an output shaft that is used to power a turbofan that forces bypass air through a fan duct to create forward thrust enabling wing 14 to provide a lifting force responsive to forward airspeed, such that tiltrotor aircraft 10 flies much like a conventional jet aircraft. Thus, in this configuration, tiltrotor aircraft 10 is considered to be in a non-rotary flight mode. FIG. 1D illustrates tiltrotor aircraft 10 in airplane forward flight mode, in which proprotor blades 22 of proprotor assemblies 20a, 20b have been folded to be oriented substantially parallel to respective pylon assemblies 18a, 18b to minimize the drag force generated by proprotor blades 22. In this configuration, engines 24a, 24b are operable in the turbofan mode and tiltrotor aircraft 10 is considered to be in the non-rotary flight mode. The forward cruising speed of tiltrotor aircraft 10 can be significantly higher in airplane forward flight mode versus proprotor forward flight mode as the forward airspeed induced proprotor aeroelastic instability is overcome.

Even though tiltrotor aircraft 10 has been described as having two engines fixed to the fuselage each operating one of the proprotor assemblies in the rotary flight mode, it should be understood by those having ordinary skill in the art that other engine arrangements are possible and are considered to be within the scope of the present disclosure including, for example, having a single engine that provides torque and rotational energy to both of the proprotor assemblies. In addition, even though proprotor assemblies 20a, 20b are illustrated in the context of tiltrotor aircraft 10, it should be understood by those having ordinary skill in the art that the proprotor assemblies disclosed herein can be implemented on other tiltrotor aircraft including, for example, quad tiltrotor aircraft having an additional wing member aft of wing 14, unmanned tiltrotor aircraft or other tiltrotor aircraft configurations.

Referring to FIGS. 2A-2G of the drawings, a mechanism for transitioning a tiltrotor aircraft between rotary and non-rotary flight modes is depicted and generally designated 100. In the illustrated embodiment, a rotor assembly 102 is depicted as a gimbal mounted, three bladed rotor assembly having a gimballing degree of freedom relative to a mast 104. Rotor assembly 102 includes a rotor hub 106 that is coupled to and operable to rotate with mast 104. Rotor hub 106 has a conical receptacle 108 extending from a lower portion thereof. Rotor hub 106 includes three arms 110 each of which support a rotor blade assembly 112, only one being visible in the figures. Each rotor blade assembly 112 includes a cuff 114 and a rotor blade 116 that is pivotably coupled to cuff 114 by a connection member depicted as pin 118. As discussed herein, rotor blade assembly 112 has a pitching degree of freedom during rotary flight and a folding degree of freedom during non-rotary flight.

The pitching and folding degrees of freedom of rotor blade assembly 112 are realized using the highly reliable operation of swash plate 120. Swash plate 120 includes a non-rotating lower swash plate element 122 and a rotating upper swash plate element 124. Rotating upper swash plate element 124 is operably coupled to each rotor blade assembly 112 at cuff 114 via a pitch link 126 and a pitch horn 128, only one such connection being visible in the figures. A control system including swash plate actuators (not pictured) is coupled to non-rotating lower swash plate element 122. The control system operates responsive to pilot input to raise, lower and tilt non-rotating lower swash plate element 122 and thus rotating upper swash plate element 124 relative to mast 104. These movements of swash plate 120 collectively and cyclically control the pitch of rotor blade assemblies 112 during rotary flight and fold rotor blade assemblies 112 during non-rotary flight.

Figure 2A:
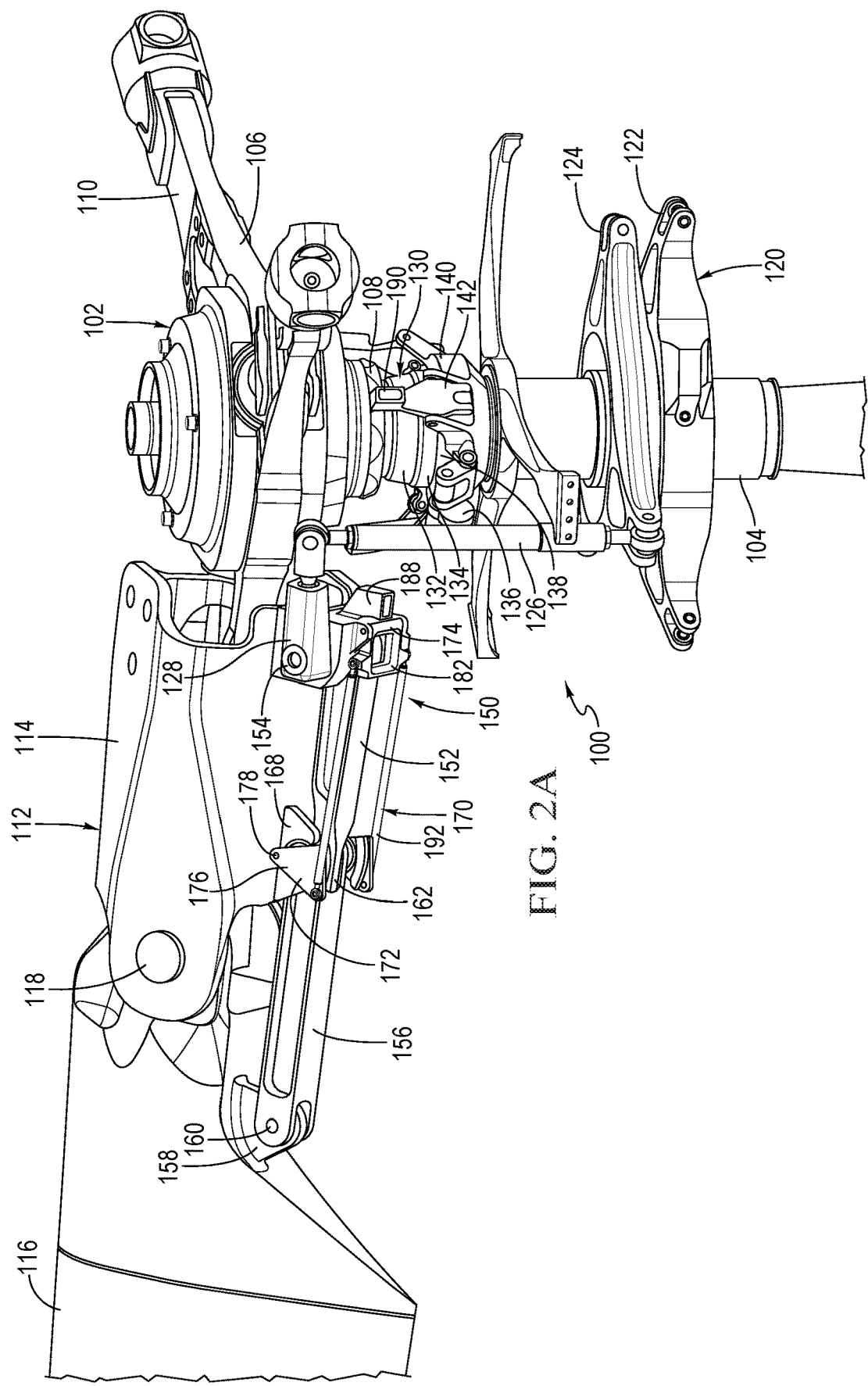
FIGS. 2A-2G are isometric views of a mechanism for transitioning a tiltrotor aircraft between rotary and non-rotary flight modes, in various positions, in accordance with embodiments of the present disclosure.
Figure 2B:
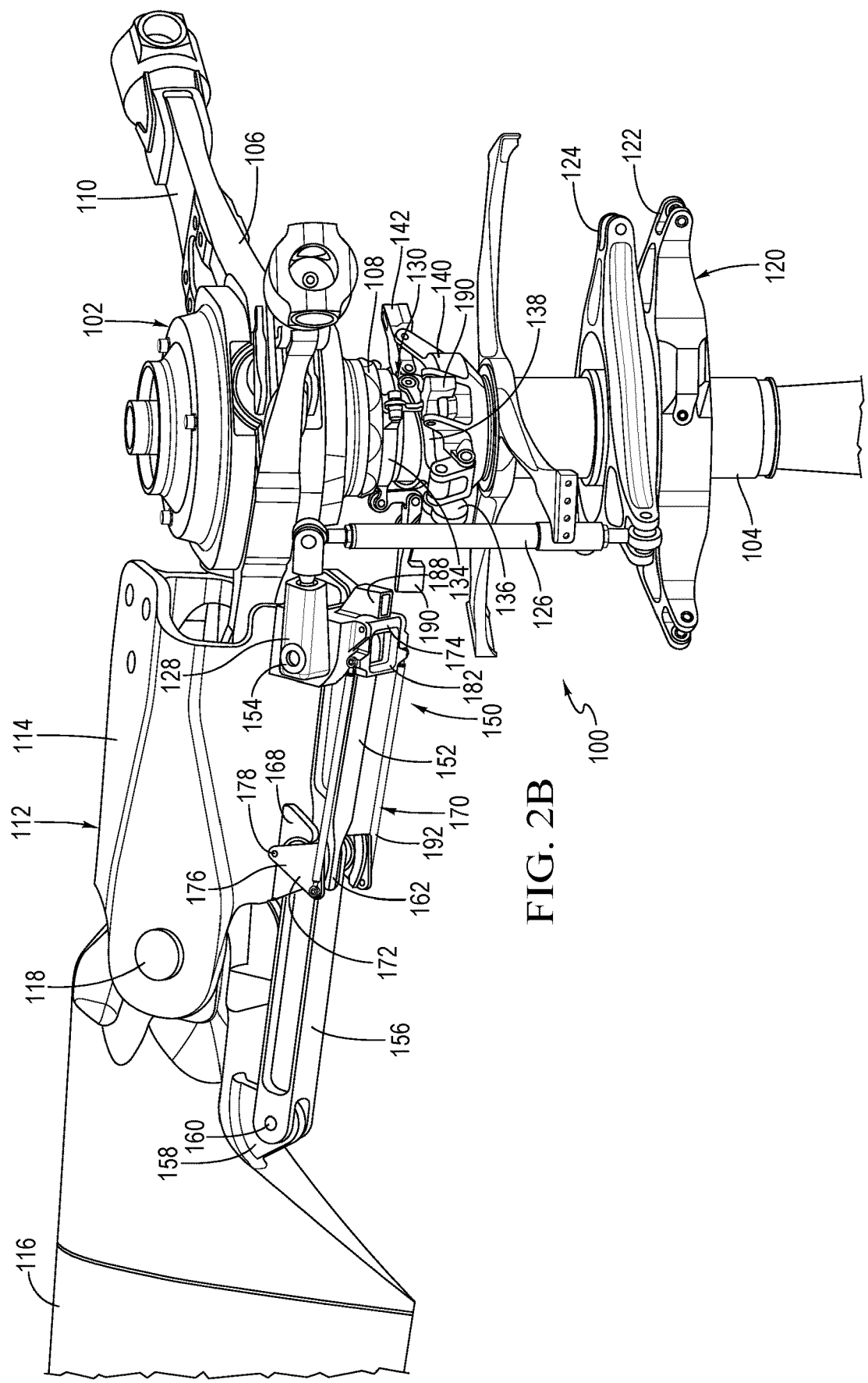

Transitioning mechanism 100 includes a gimbal lock 130 that is coupled to and operable to rotate with mast 104. Gimbal lock 130 includes a conical ring 132, an actuation ring 134 and an actuator 136 including a lift ring 138. Gimbal lock 130 is operable to selectively enable and disable the gimballing degree of freedom of rotor assembly 102 relative to mast 104. As best seen in FIG. 2A, gimbal lock 130 is disengaged from rotor assembly 102, which enables the gimballing degree of freedom of rotor assembly 102. In this configuration, there is an axial separation between conical ring 132 of gimbal lock 130 and conical receptacle 108 of rotor hub 106 such that any teetering or flapping motion of rotor assembly 102 is not impacted by gimbal lock 130. When it is desired to transition the tiltrotor aircraft from the rotary flight mode and the non-rotary flight mode, actuator 136 is operated to cause lift ring 138 to raise actuation ring 134, which in turn raises conical ring 132 into conical receptacle 108 of rotor hub 106. In this configuration, as best seen in FIG. 2B, gimbal lock 130 is engaged with rotor assembly 102, which disables the gimballing degree of freedom of rotor assembly 102 relative to mast 104 for non-rotary flight. In the illustrated embodiment, conical ring 132 has a conical geometry that is configured to mate with a similar geometry of conical receptacle 108 thus disabling the gimballing degree of freedom of rotor assembly 102 relative to mast 104. It should be appreciated, however, that the exact mating geometry of conical ring 132 and conical receptacle 108 is implementation specific and not limited to the illustrated geometry.

Figure 2C:
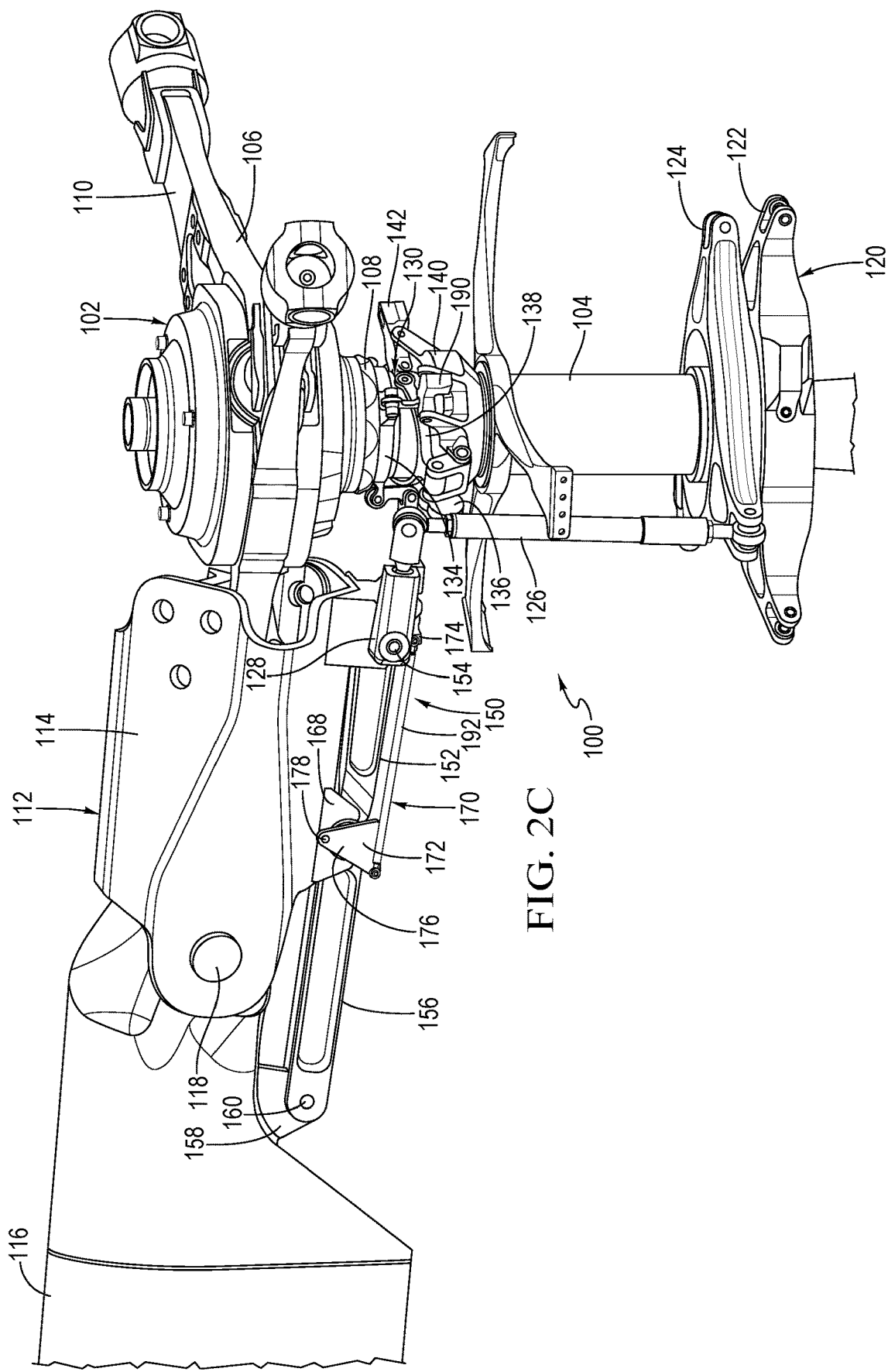

Transitioning mechanism 100 also includes a blade stop assembly 140 that is coupled to and operable to rotate with mast 104. Blade stop assembly 140 including three arms 142 that correspond to the three rotor blade assemblies 112 of rotor assembly 102. In the illustrated embodiment, blade stop assembly 140 is integrated with gimbal lock 130 and shares actuation ring 134, actuator 136 and lift ring 138 therewith, such that operation of blade stop assembly 140 occurs together with the operation of gimbal lock 130. It should be appreciated, however, that a blade stop assembly and a gimbal lock for use with the embodiments disclosed herein could alternatively operate independent of one another. As best seen in FIG. 2A, arms 142 of blade stop assembly 140 have a radially contracted orientation, which provides clearance for rotor blade assemblies 112 during rotary flight. When it is desired to transition the tiltrotor aircraft from the rotary flight mode and the non-rotary flight mode, actuator 136 is operated to cause lift ring 138 to raise actuation ring 134, which in turn shifts arms 142 from the radially contracted orientation to a radially extended orientation, as best seen in FIG. 2B. In this configuration, arms 142 of blade stop assembly 140 will each engage cuff 114 of rotor blade assembly 112 upon feathering the rotor blade assemblies 112 responsive to lowering swash plate 120, as best seen in FIG. 2C. In this manner, blade stop assembly 140 provides a positive stop for rotor blade assemblies 112.

Referring additionally to FIGS. 3A-3E, transitioning mechanism 100 includes three blade lock assemblies 150, only one being visible in the figures. Each blade lock assembly 150 is selectively operable to enable and disable the folding degree of freedom and the pitching degree of freedom of the respective rotor blade assembly 112. As illustrated, each blade lock assembly 150 includes a crank 152 that is rotatably coupled to cuff 114 and rotatable with pitch horn 128 via a connection member depicted as pin 154. In this manner, rotation of crank 152 is responsive to the rise and fall of swash plate 120 in non-rotary flight. Each blade lock assembly 150 also includes a link 156 that is rotatably coupled to rotor blade 116 at lug 158 via a connection member depicted as pin 160. Crank 152 and link 156 are coupled together at a pivot joint 162. In the illustrated embodiment, coincident with pivot joint 162, link 156 includes a pair of outwardly extending flanges 164 each having a roller element 166 rotatably coupled thereto. Each flange 164 is receivable in a seat 168 of cuff 114 when it is desired to disable the folding degree of freedom of rotor blade assembly 112. Preferably, an arch shaped geometry of the contact surface of each seat 168 is sized such that a fully engaged flange 164 seated therein will have two points of contact therewith providing a stiff connection, thereby minimizing any vibrations and/or relative movement between the parts.

Figure 3A:
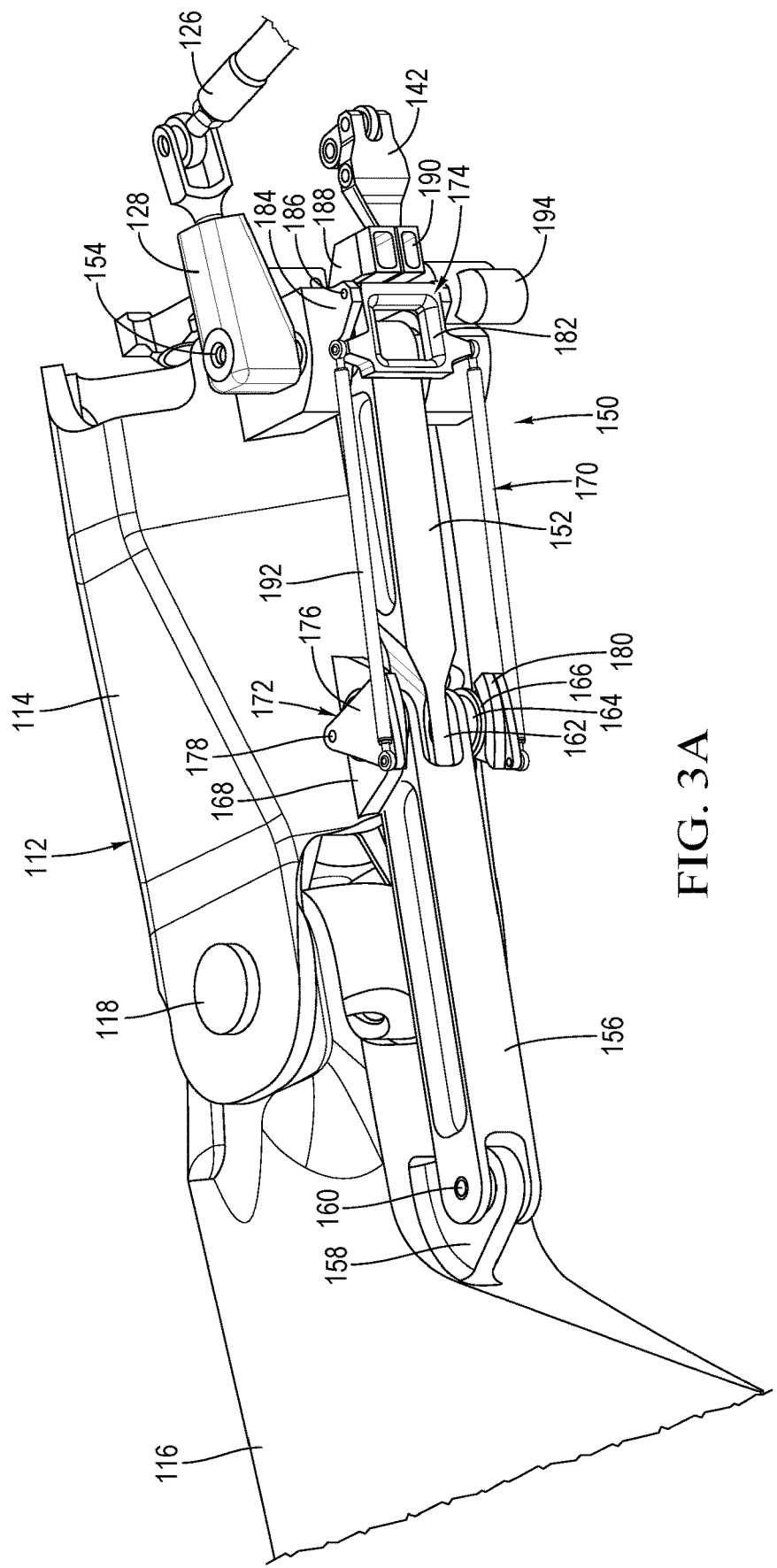
FIGS. 3A-3E are isometric views of a blade lock assembly of a mechanism for transitioning a tiltrotor aircraft between rotary and non-rotary flight modes, in various positions, in accordance with embodiments of the present disclosure.
Figure 3B:
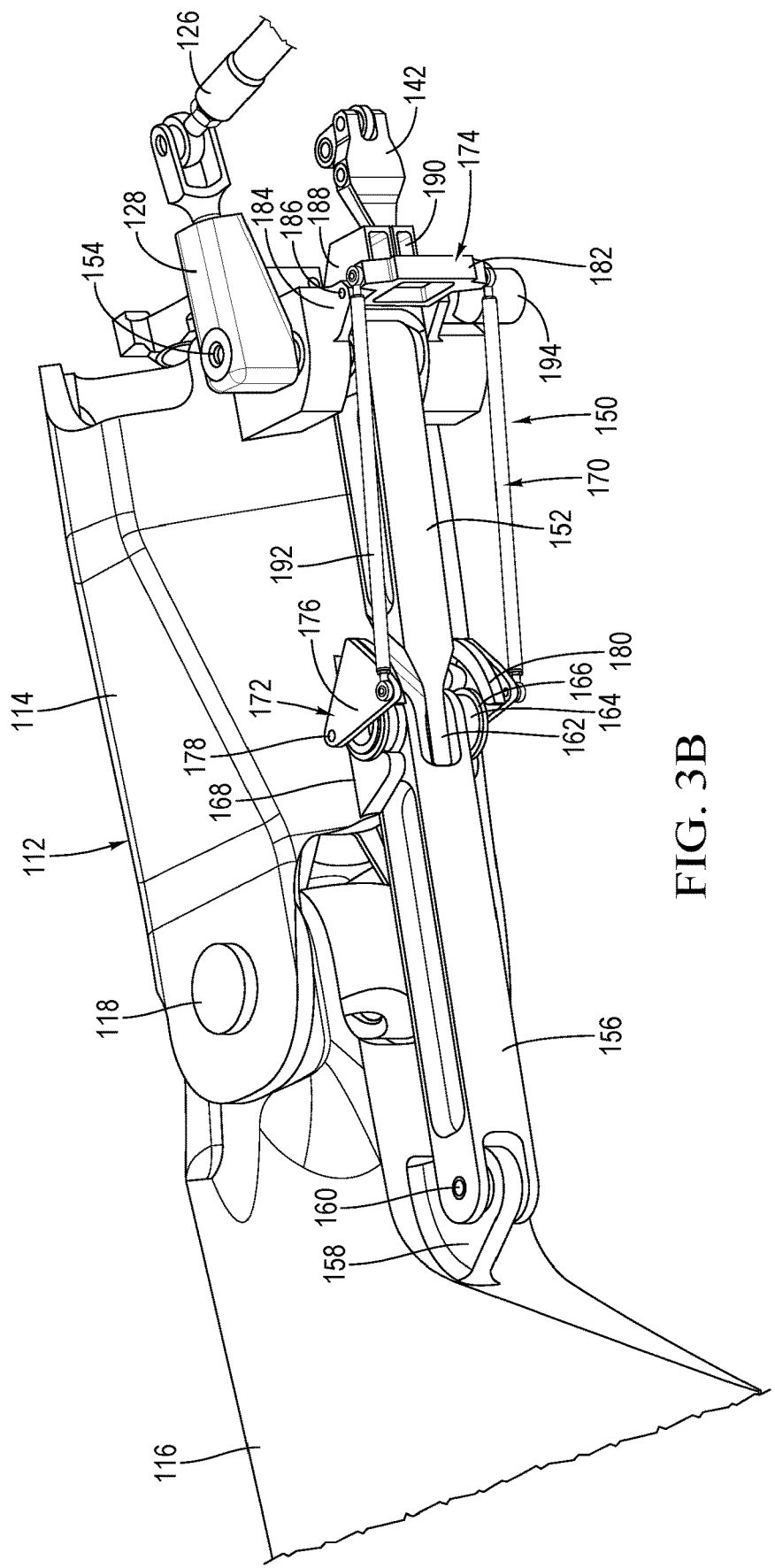
Figure 3C:
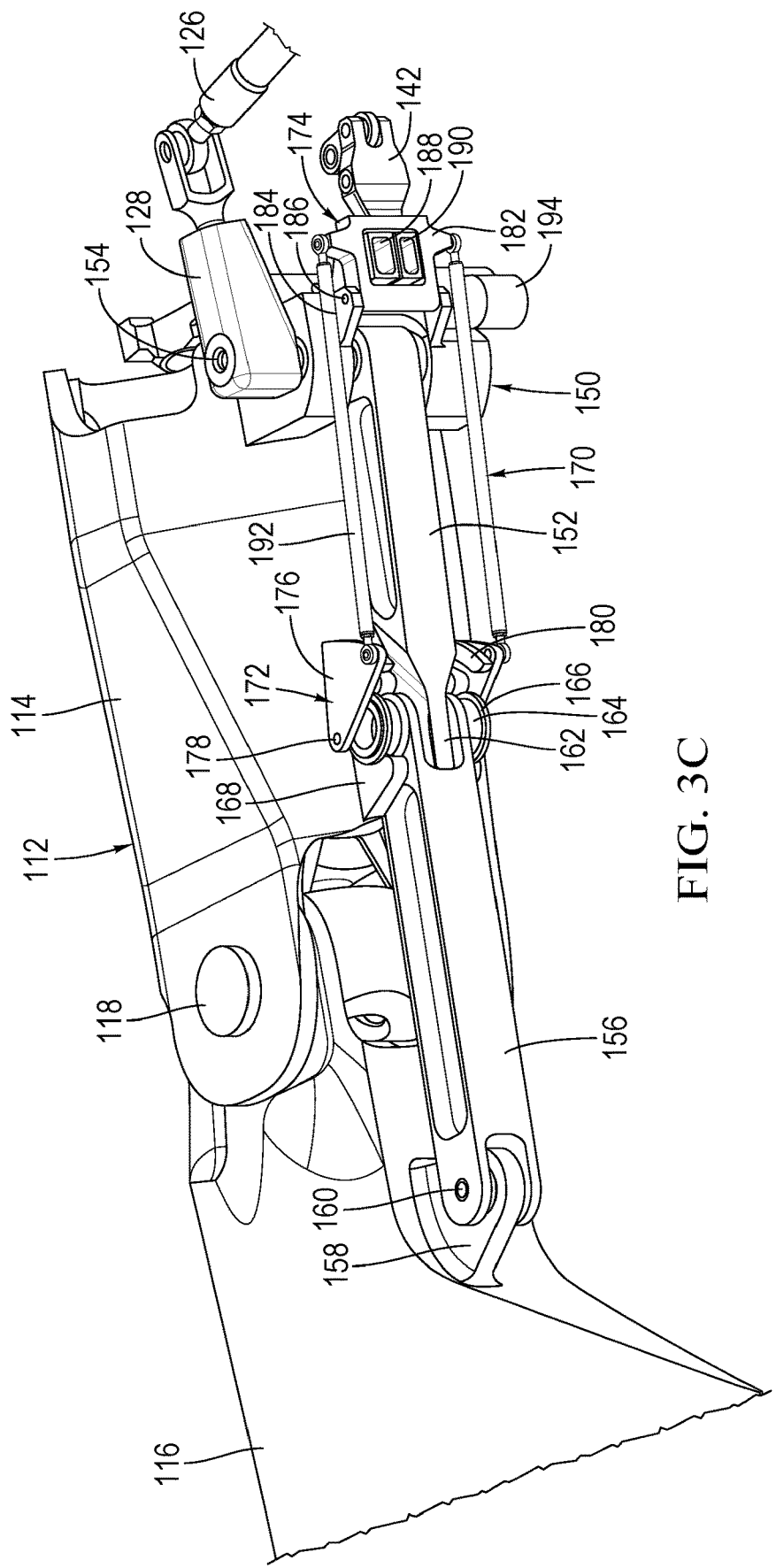

Each blade lock assembly 150 further includes a blade lock 170 having a fold lock position securing pivot joint 162 to cuff 114 and a pitch lock position securing cuff 114 to arm 142 of blade stop assembly 140. More specifically, each blade lock 170 includes a fold lock 172 and a pitch lock 174. Each fold lock 172 consists of a pair of arms 176 that are rotatably coupled to respective seats 168 of cuff 114 via connection members depicted as pins 178. Each arm 176 includes a wedge 180 having a bearing surface that contacts a respective roller element 166 and provides maximum contact force when fold lock 172 is fully engaged, as best seen in FIG. 3A. Each pitch lock 174 includes a hasp 182 that is rotatably coupled to a pair of lugs 184 of cuff 114 via a connection member depicted as pin 186. Each hasp 182 includes a central opening operable to selectively receive and retain a tab 188 of cuff 114 and a tab 190 of arm 142 therein, as best seen in FIG. 3C. In the illustrated embodiment, fold lock 172 and a pitch lock 174 are coupled together by a pair of adjustable connecting rods 192 such that a single actuator 194 is operable to shift blade lock 170 between the fold lock position, depicted in FIG. 3A, and the pitch lock position, depicted in FIG. 3B. It should be appreciated, however, that a fold lock and a pitch lock for use with the embodiments disclosed herein could alternatively operate independent of one another.

The operation of transitioning mechanism 100 will now be described with reference to an exemplary flight of tiltrotor aircraft 10. For vertical takeoff and hovering in helicopter flight mode, as best seen in FIG. 1A, and low speed forward flight in proprotor forward flight mode, as best seen in FIG. 1B, tiltrotor aircraft 10 is in rotary flight mode. To achieve this operational mode, engines 24a, 24b are in turboshaft mode to provide torque and rotational energy to proprotor assemblies 20a, 20b, gimbal lock 130 is in the disengaged position enabling the gimballing degree of freedom of rotor assemblies 102, as best seen in FIG. 2A, arms 142 of blade stop assembly 140 are in the radially contracted orientation providing clearance for rotor assemblies 102, as best seen in FIG. 2A, and each of the blade lock assemblies 150 is enabling the pitching degree of freedom and disabling the folding degree of freedom of rotor blade assemblies 112, as best seen in FIG. 3A. In this configuration, swash plate 120 collectively and cyclically controls the pitch of rotor blade assemblies 112 responsive to pilot input.

When it is desired to transition tiltrotor aircraft 10 from low speed forward flight in proprotor forward flight mode, as best seen in FIG. 1B, to high speed forward flight in airplane forward flight mode, as best seen in FIG. 1D, transitioning mechanism 100 is used to safely achieve this result. As a preliminary step, engines 24a, 24b are transitioned from turboshaft mode to turbofan mode until forward thrust is solely generated by engines 24a, 24b and tiltrotor aircraft 10 is in non-rotary flight mode. Swash plate 120 is now used to collectively shift the pitch of rotor blade assemblies 112 to the feathering position, as best seen in FIG. 1C, wherein rotor blades 116 act as brakes to aerodynamically stop the rotation of rotor assemblies 102. To disable the gimballing degree of freedom of rotor assembly 102, actuator 136 is operated to cause lift ring 138 to raise actuation ring 134, which in turn raises conical ring 132 into conical receptacle 108 of rotor hub 106, as best seen in FIG. 2B. At the same time, responsive to lift ring 138 raising actuation ring 134, arms 142 shift from the radially contracted orientation to the radially extended orientation, as best seen in FIG. 2B, to provide a positive stop for rotor blade assemblies 112.

Next, actuators 194 are operated to shift blade locks 170 from the fold lock position, depicted in FIG. 3A, to the pitch lock position, depicted in FIG. 3C. Actuator 194 simultaneously causes hasp 182 to rotate relative to lugs 184 of cuff 114 about pin 186 and arms 176 to rotate relative to seats 168 of cuff 114 about pins 178, as best seen in FIG. 3B. At the end of travel, hasp 182 has received tab 188 of cuff 114 and tab 190 of arm 142 in a central opening, as best seen in FIG. 3C, which disables the pitching degree of freedom of rotor blade assemblies 112. Also, at the end of travel, wedges 180 have cleared the lower portion of seats 168, which enables the folding degree of freedom of rotor blade assemblies 112. Swash plate 120 is now used to collectively shift rotor blade assemblies 112 from the radially outwardly extending feathering position, as best seen in FIG. 1C, to a folded orientation, as best seen in FIGS. 1D and 2G.

Figure 2F:
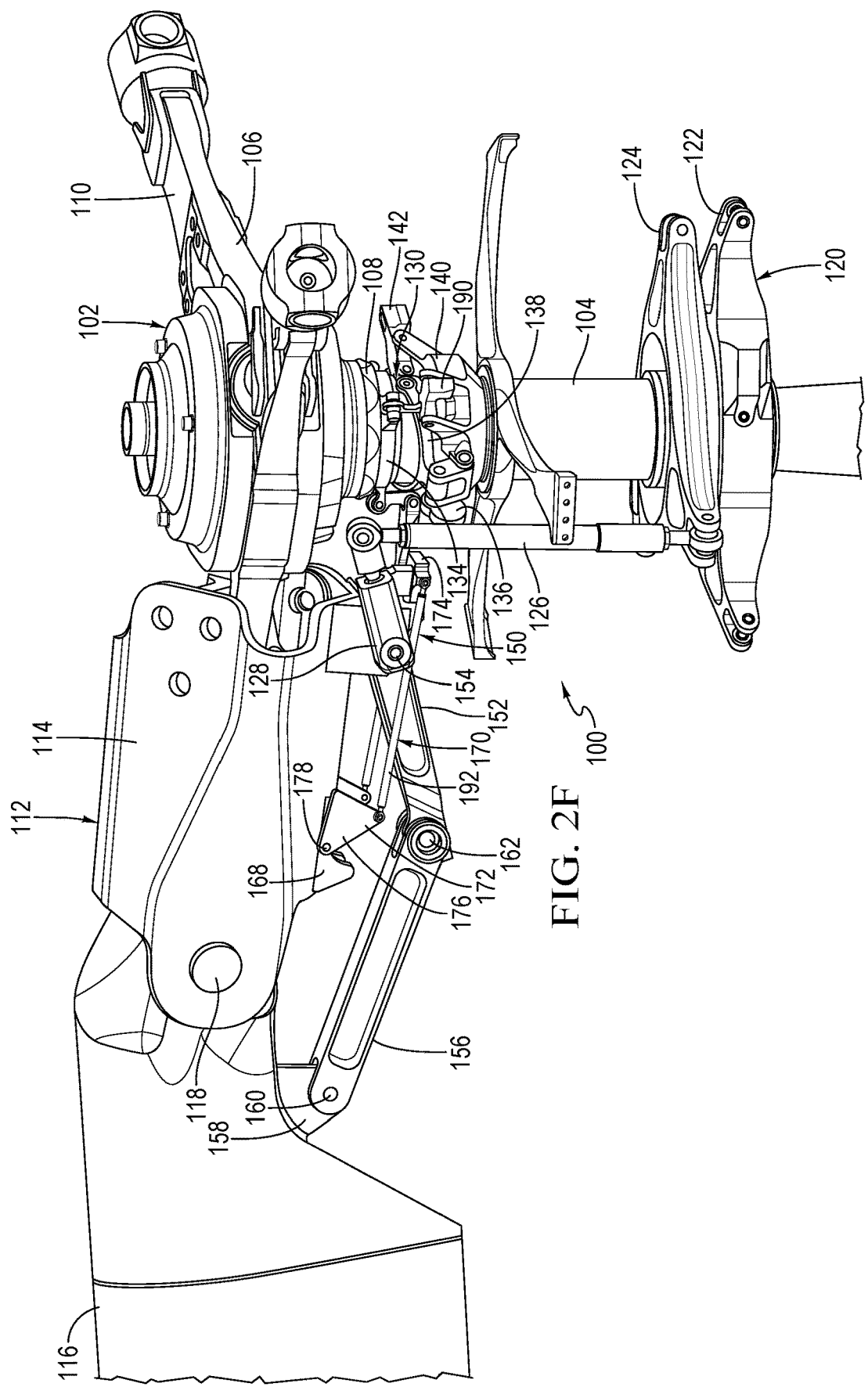
Figure 2G:
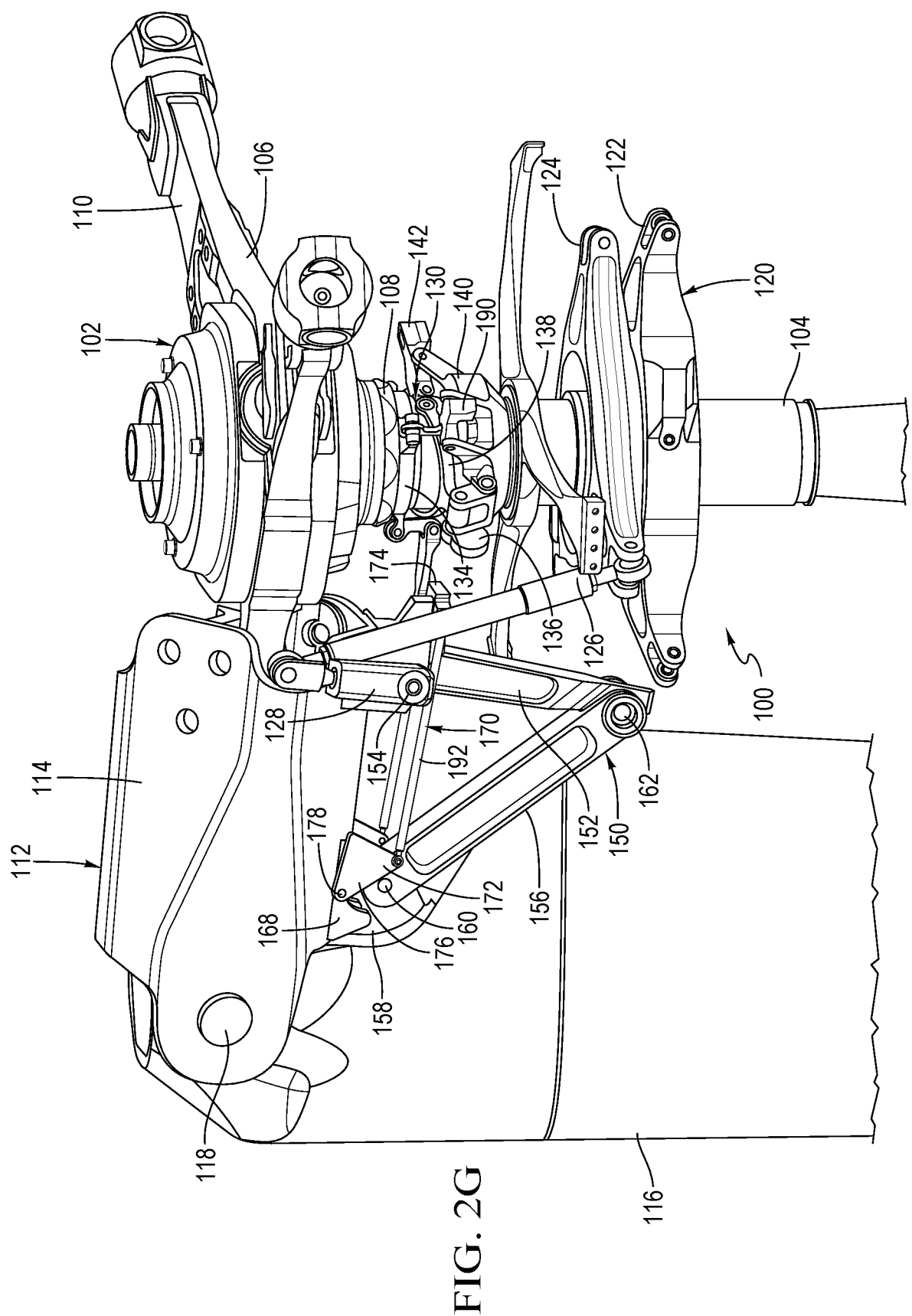
Figure 3D:
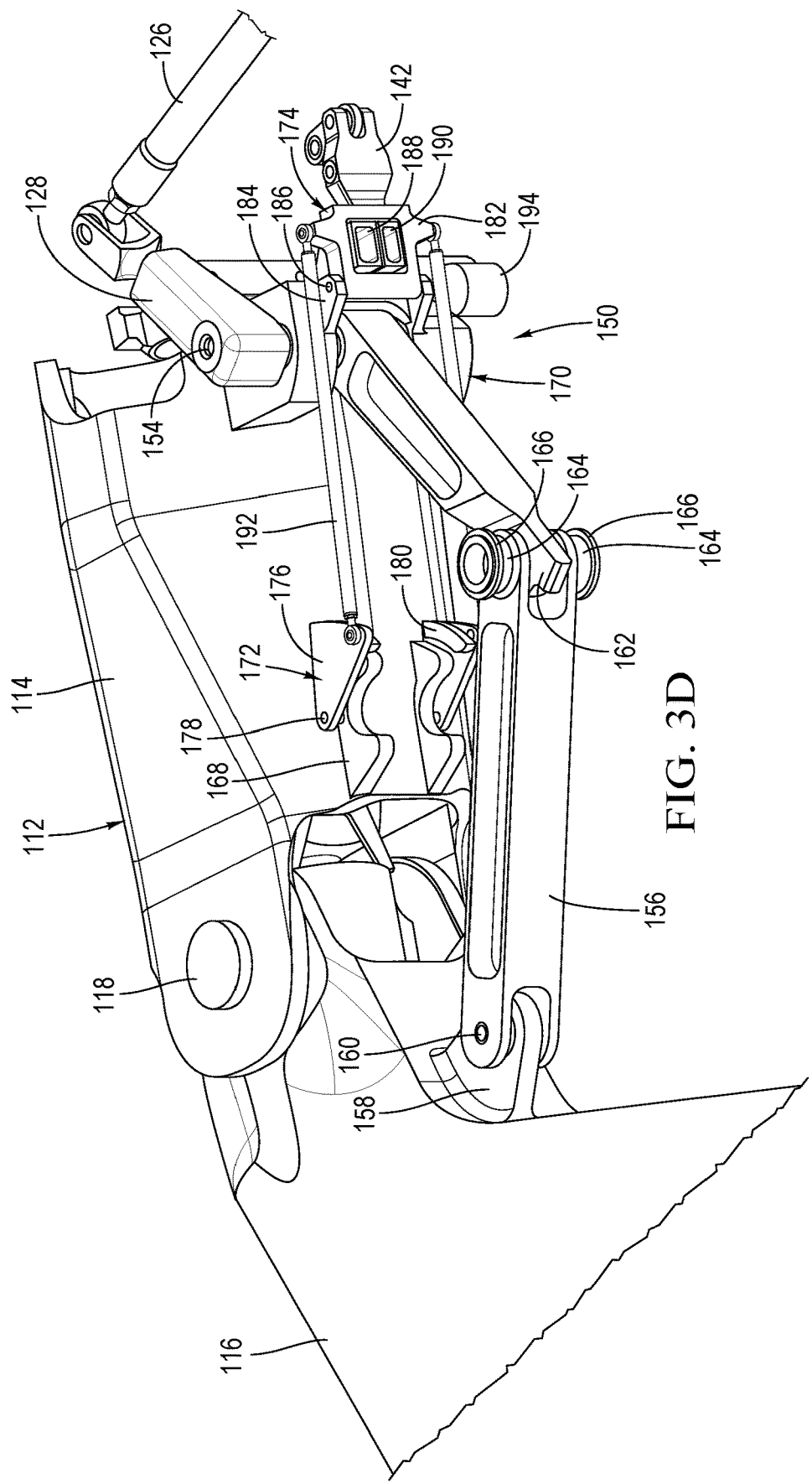
Figure 3E:
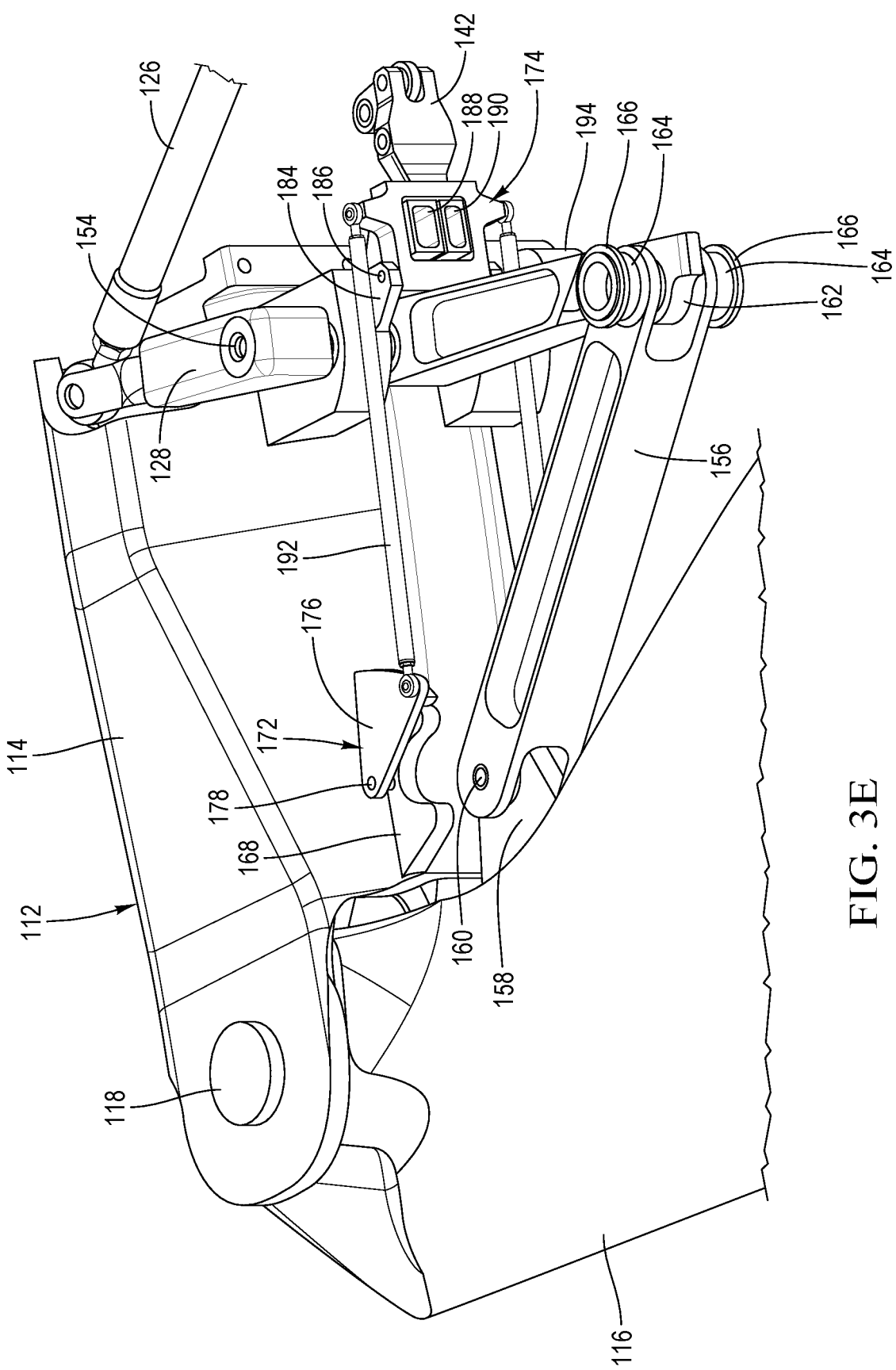

With the pitching degree of freedom disabled, rise and fall of swash plate 120 now rotates pitch horn 128 relative to cuff 114, which in turn causes rotation of crank 152. The rotation of crank 152 causes rotation of link 156 relative to lug 158 about pin 160, rotation in pivot joint 162, which disengages flanges 164 from seats 168, and rotation of rotor blade 116 relative to cuff 114 about pin 118, as best seen in FIGS. 2F and 3D. Continued operation of swash plate 120 causes continued rotation of pitch horn 128, crank 152, link 156 and rotor blade 116 until rotor blade 116 reaches its desired folded orientation, as best seen in FIGS. 2G and 3E. Tiltrotor aircraft 10 is now in airplane flight mode, which is the high-speed forward flight mode of tiltrotor aircraft 10 and is a non-rotary flight mode. In this operational mode, engines 24a, 24b are in turbofan mode providing no torque and rotational energy to proprotor assemblies 20a, 20b, gimbal lock 130 is in the engaged position disabling the gimballing degree of freedom of rotor assemblies 102, arms 142 of blade stop assembly 140 are in the radially extended orientation providing a position stop and coupling for rotor blade assemblies 112, and each of the blade lock assemblies 150 is disabling the pitching degree of freedom and enabling the folding degree of freedom of rotor blade assemblies 112.

When it is desired to transition back to proprotor forward flight mode, as best seen in FIG. 1B, from airplane forward flight mode, as best seen in FIG. 1D, transitioning mechanism 100 is used to safely achieve this result. With the pitching degree of freedom disabled, lowering swash plate 120 rotates pitch horn 128 relative to cuff 114, which in turn causes rotation of crank 152, link 156 and the unfolding of rotor blade 116, as best seen in FIGS. 2F and 3D. Continued operation of swash plate 120 causes continued rotation of pitch horn 128, crank 152, link 156 and rotor blade 116 until rotor blade 116 reaches its desired radially outwardly extending orientation, as best seen in FIG. 2E. In this position, crank 152 and link 156 are generally aligned such that flanges 164 have entered seats 168, as best seen in FIG. 3C.

Figure 2D:
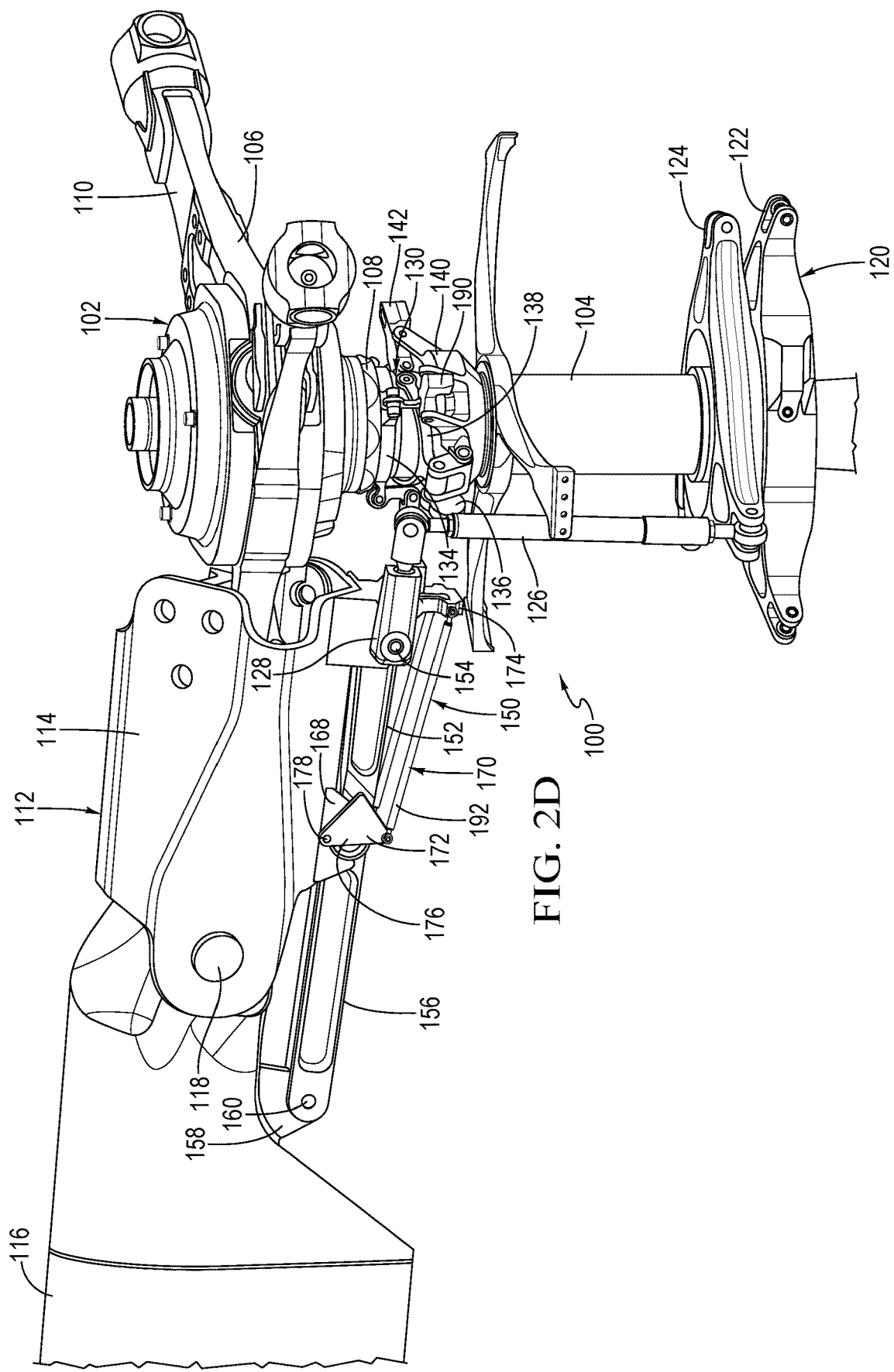
Figure 2E:
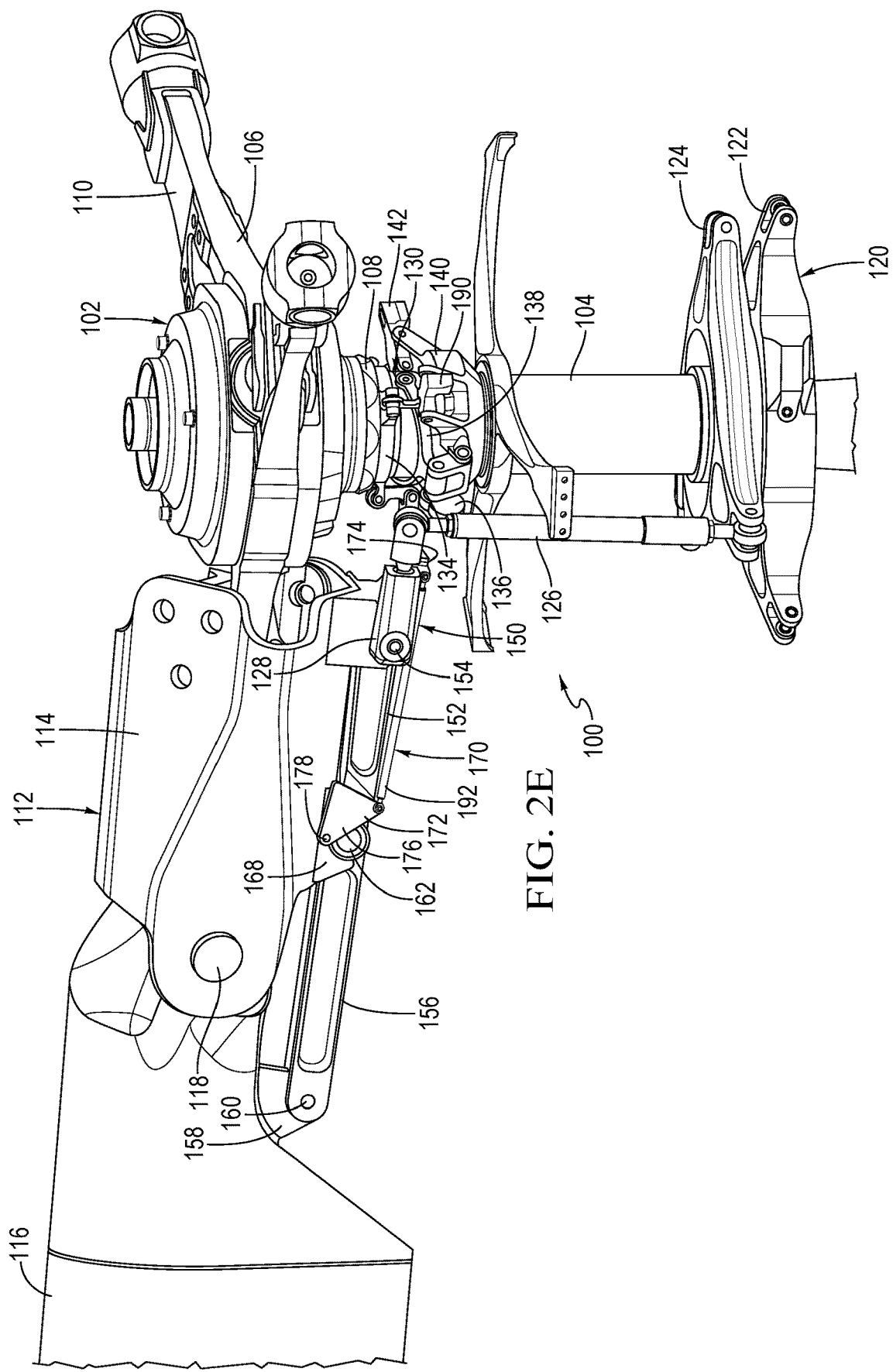

Next, actuators 194 are operated to shift blade locks 170 from the pitch lock position, depicted in FIG. 3C, to the fold lock position, depicted in FIGS. 2D and 3A. Actuator 194 simultaneously causes hasp 182 to rotate relative to lugs 184 of cuff 114 about pin 186 and arms 176 to rotate relative to seats 168 of cuff 114 about pins 178, as best seen in FIGS. 2D and 3B. At the end of travel, hasp 182 is remote from tab 188 of cuff 114 and tab 190 of arm 142, as best seen in FIG. 3A, which enables the pitching degree of freedom of rotor blade assemblies 112. Also, at the end of travel, wedges 180 have contacted roller element 166 seating flanges 164 tightly within seats 168 and disabling the folding degree of freedom of rotor blade assembly 112, as best seen in FIG. 3A. Swash plate 120 may now be used to collectively shift rotor blade assemblies 112 from the feathering position, as best seen in FIG. 1C, to a windmilling orientation.

To enable the gimballing degree of freedom of rotor assembly 102, actuator 136 is operated to cause lift ring 138 to lower actuation ring 134, which in turn lowers conical ring 132 out of engagement with conical receptacle 108 of rotor hub 106, as best seen in FIG. 2A. At the same time, responsive to lift ring 138 lower actuation ring 134, arms 142 shift from the radially extended orientation to the radially contracted orientation, as best seen in FIG. 2A, to provide clearance for rotor blade assemblies 112. Next, engines 24a, 24b are transitioned from turbofan mode to turboshaft mode such that forward thrust is provided by proprotor assemblies 20a, 20b and tiltrotor aircraft 10 is in the rotary flight mode. From this configuration, tiltrotor aircraft 10 may now be transitioned to helicopter mode when it is desired to hover and/or land the aircraft.

There is little force required to be transmitted from swash plate 120 through pitch link 126, pitch horn 128, crank 152, and link 156 to fold rotor blades 116 from the extended position to the folded position because air is pushing against rotor blades 116, encouraging rotor blades 116 to fold aft. However, when transitioning from airplane forward flight mode to proprotor forward flight mode, the force required to be transmitted from swash plate 120 through pitch link 126, pitch horn 128, crank 152, and link 156 to unfold rotor blades 116 is far greater, as it needs to overcome the air pushing rotor blades 116 aft. As best shown in FIG. 2G, the direction of the force applied by link 156 to lug 158 when unfolding rotor blade 116 nearly passes directly through pin 118. Thus, because of the small moment arm acting on rotor blade 116, a very large force magnitude is required to unfold rotor blade 116. The moment arm could be increased by shortening a length of crank 152. However, shortening the length of crank 152 would also reduce the magnitude of the force and would require pitch horn 128 and crank 152 to rotate more than 90 degrees to achieve less than 90 degrees of rotor blade 116 rotation.

Therefore, an improved mechanism for transitioning a tiltrotor aircraft between rotary and non-rotary flight modes, that is optimized to overcome the forces faced while unfolding rotor blades, is depicted in FIGS. 4A-4C, 5, and 6A-6C, and is generally designated 200. In the illustrated embodiment, a rotor assembly 202 is depicted as a gimbal mounted, three bladed rotor assembly having a gimballing degree of freedom relative to a mast 204. Rotor assembly 202 includes a rotor hub 206 that is coupled to and operable to rotate with mast 204. Rotor hub 206 has a lower surface 207, an upper surface 209, and three arms 210, each of arms 210 supporting a rotor blade assembly 212, only one rotor blade assembly 212 being visible in the figures. Each rotor blade assembly 212 includes a cuff 214 and a rotor blade 216 that is pivotably coupled to cuff 214 by a connection member depicted as pin 218, whereby rotor blade 216 pivots relative to cuff 214 about a blade-fold axis 219. As discussed herein, rotor blade assembly 212 has a pitching degree of freedom during rotary flight and a folding degree of freedom during non-rotary flight. The pitching degree of freedom is about a pitch-change axis 221, which is generally perpendicular to blade-fold axis 219.

The pitching and folding degrees of freedom of rotor blade assembly 212 are realized using the highly reliable operation of swash plate 220. Swash plate 220 includes a non-rotating lower swash plate element 222 and a rotating upper swash plate element 224. Rotating upper swash plate element 224 is operably coupled to each rotor blade assembly 212 at cuff 214 via a pitch link 226 and a pitch horn 228, only one such connection being visible in the figures. A control system, including swash plate actuators 229, is coupled to non-rotating lower swash plate element 222. The control system operates responsive to pilot input to raise, lower and tilt non-rotating lower swash plate element 222 and thus rotating upper swash plate element 224 relative to mast 204. These movements of swash plate 220 collectively and cyclically control the pitch of rotor blade assemblies 212 during rotary flight and fold rotor blades 216 during non-rotary flight.

Transitioning mechanism 200 includes a gimbal lock similar in operation to gimbal lock 130 of transitioning mechanism 100, discussed above. However, for ease of illustration, it is omitted from the figures depicting transitioning mechanism 200. Transitioning mechanism 200 also includes a blade stop assembly 240 that is coupled to, and operable to rotate with, mast 204. Blade stop assembly 240 includes three arms 242 that correspond to the three rotor blade assemblies 212 of rotor assembly 202. Similar to blade stop assembly 140 of transitioning mechanism 100, blade stop assembly 240 is integrated with the gimbal lock mechanism (not shown). However, blade stop assembly 240 differs from blade stop assembly 140 in that arms 242 are not radially retractable. Instead, arms 242 are radially fixed and are moved vertically along mast 204 from a bottom position (not shown) to a top position, in and out of engagement with blade assemblies 212 with actuation of the gimbal lock (not shown). In this configuration, arms 242 of blade stop assembly 240 will each engage blade assembly 212 upon feathering rotor blade assemblies 212, responsive to lowering swash plate 220. In this manner, blade stop assembly 240 provides a positive stop for rotor blade assemblies 212.

Transitioning mechanism 200 also includes three blade lock assemblies 250, only one being visible in the figures. Each blade lock assembly 250 is selectively operable to enable and disable the folding degree of freedom and the pitching degree of freedom of the respective rotor blade assembly 212. As illustrated, each blade lock assembly 250 includes a crank 252 that is rotatably coupled to cuff 214 and rotatable with pitch horn 228 via a connection member depicted as pin 254. In this manner, rotation of crank 252 is responsive to the rise and fall of swash plate 220 in non-rotary flight. Crank 252 and pitch horn 228 rotate relative to relative to cuff 214 about a crank axis 255.

It is this placement of crank axis 255 closer to pitch-change axis 221 that solves the problem of a short moment arm when unfolding rotor blades 216, discussed above with regard to transitioning mechanism 100. However, locating crank axis 255 closer to pitch-change axis 221 creates other problems. For example, cuff 214 carries centrifugal loads and pitch loads transferred from rotor blade 216. As such, cuff 214 must be torsionally and axially stiff to resist these loads. Creating holes in cuff 214 to accommodate placing crank axis 255, and therefore pin 254, through cuff 214 could materially deteriorate the required stiffness. However, as discussed below, the design shown and discussed herein manages to overcome that potential dilemma. In addition, simply moving crank axis 255 up would cause interference between pitch horn 228 and rotor hub 206. Because rotor hub 206 carries massive loads, creating a notch to provide clearance for pitch horn 228 is not feasible. Accordingly, crank axis 255 is canted to cause pitch horn 228 to rotate away from rotor hub 206.

Figure 4C:
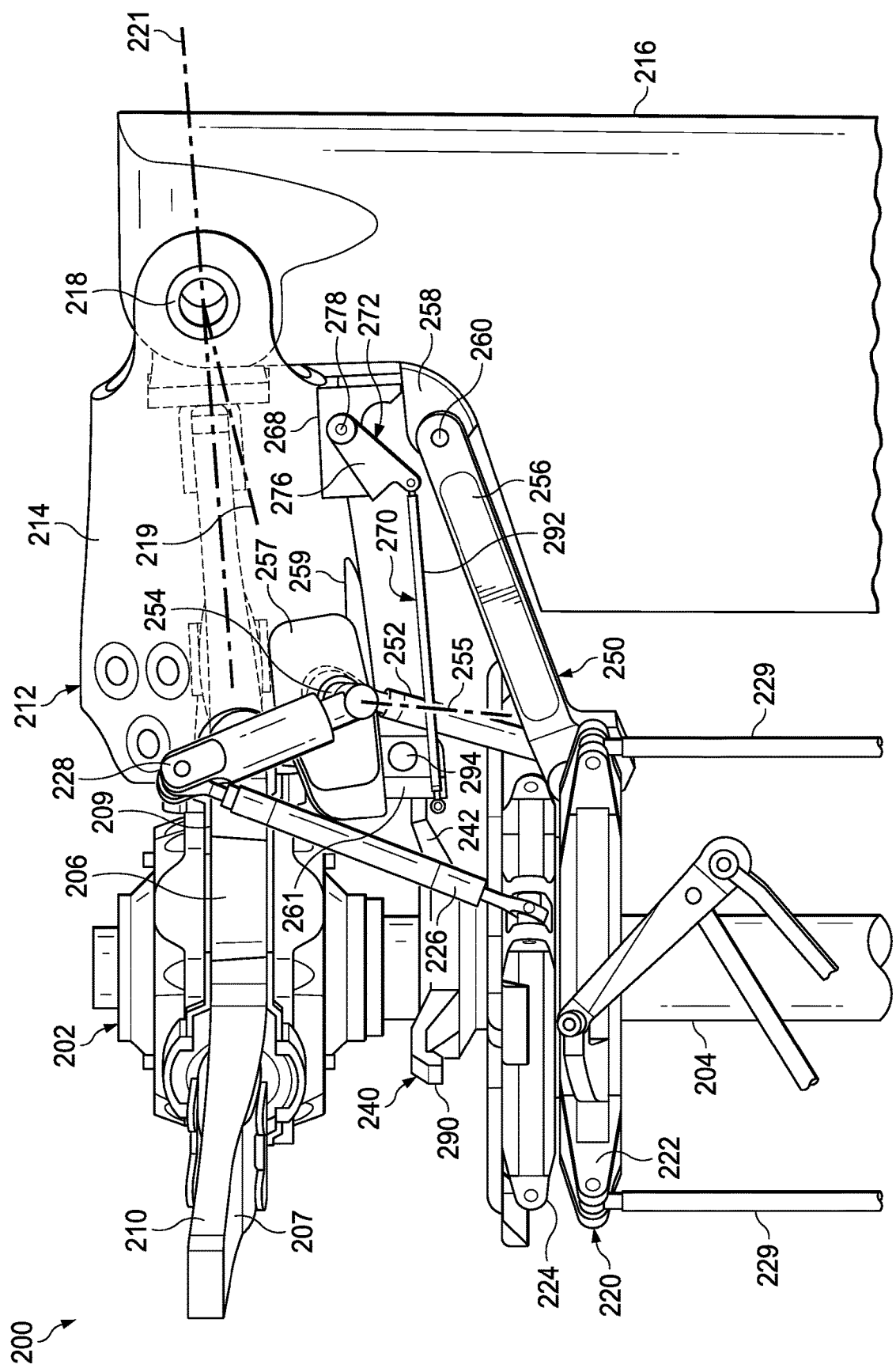
Figure 5:
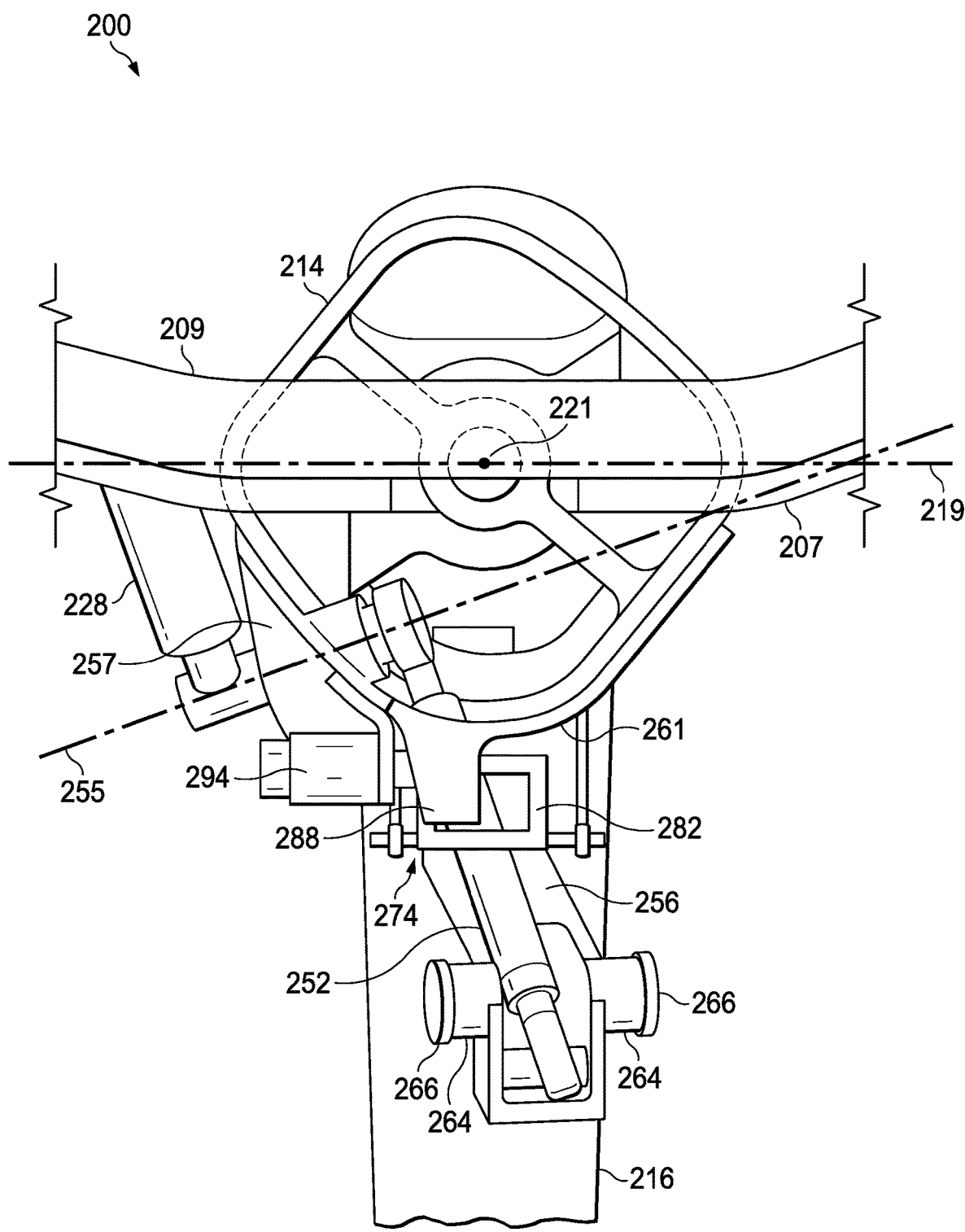
FIG. 5 is a side view of the mechanism of FIGS. 4A-4C.

Therefore, as best shown in FIG. 5, crank axis 255 is skew relative to blade-fold axis 219, and pin 254 extends through cuff 214. Crank axis 255 is angled about 18 degrees relative to blade-fold axis 219. Accordingly, crank 252 is coupled to pin 254 within a volume of cuff 214. Pin 254 preferably comprises a tapered roller bearing to facilitate rotation about crank axis 255 while resisting axial forces along crank axis 255. As best shown, in FIG. 4C, a portion of pitch horn 228 extends above upper surface 209 of rotor hub 206 when rotor blade 216 is in the folded position. Canted crank axis 225 enables this to occur without effecting the structural integrity of rotor hub 206. In addition, it preserves the preferred configuration that causes greater than 90 degrees of rotation of rotor blade 216 in response to less than 90 degrees of rotation of pitch horn 228. To prevent the opening through which pin 254 extends from weakening cuff 214, a plate 257 is coupled to cuff 214. In order to accommodate crank 252 extending into cuff 214, cuff 214 includes a slot 259. To prevent slot 259 from impacting the torsional stiffness of cuff 214, a plate 261 is coupled to cuff 214. Each blade lock assembly 250 also includes a link 256 that is rotatably coupled to rotor blade 216 at lug 258 via a connection member depicted as pin 260. Crank 252 and link 256 are coupled together at a pivot joint 262. In the illustrated embodiment, coincident with pivot joint 262, link 256 includes a pair of outwardly extending flanges 264 each having a roller element 266 rotatably coupled thereto. Each flange 264 is receivable in a seat 268 of cuff 214 when it is desired to disable the folding degree of freedom of rotor blade assembly 212. Preferably, an arch shaped geometry of the contact surface of each seat 268 is sized such that a fully engaged flange 264 seated therein will have two points of contact therewith providing a stiff connection, thereby minimizing any vibrations and/or relative movement between the parts.

Each blade lock assembly 250 further includes a blade lock 270 having a fold lock position securing pivot joint 262 to cuff 214 and a pitch lock position securing cuff 214 to arm 242 of blade stop assembly 240. More specifically, each blade lock 270 includes a fold lock 272 and a pitch lock 274. Each fold lock 272 consists of a pair of arms 276 (only one shown) that are rotatably coupled to respective seats 268 of cuff 214 via connection members depicted as pins 278. Each arm 276 includes a wedge (not shown) having a bearing surface that contacts the respective roller element 266 of flange 264 and provides maximum contact force when fold lock 272 is fully engaged. Each pitch lock 274 includes a hasp 282 that is rotatably coupled to plate 261 via a connection member (not shown). Each hasp 282 includes a central opening operable to selectively receive and retain a tab 288 of plate 261 and a tab 290 of arm 242 therein. In the illustrated embodiment, fold lock 272 and a pitch lock 274 are coupled together by a pair of adjustable connecting rods 292 (only one shown) such that a single actuator 294 is operable to shift blade lock 270 between the fold lock position and the pitch lock position. It should be appreciated, however, that a fold lock and a pitch lock for use with the embodiments disclosed herein could alternatively operate independent of one another.

The operation of transitioning mechanism 200 will now be described with reference to an exemplary flight of tiltrotor aircraft 10. For vertical takeoff and hovering in helicopter flight mode, as best seen in FIG. 1A, and low speed forward flight in proprotor forward flight mode, as best seen in FIG. 1B, tiltrotor aircraft 10 is in rotary flight mode. To achieve this operational mode, engines 24a, 24b are in turboshaft mode to provide torque and rotational energy to proprotor assemblies 20a, 20b, the gimbal lock is in the disengaged position enabling the gimballing degree of freedom of rotor assemblies 202, arms 242 of blade stop assembly 240 are in the bottom position (not shown) providing clearance for rotor assemblies 202, and each of blade lock assemblies 250 is enabling the pitching degree of freedom and disabling the folding degree of freedom of rotor blade assemblies 212. In this configuration, swash plate 220 collectively and cyclically controls the pitch of rotor blade assemblies 212 responsive to pilot input.

When it is desired to transition tiltrotor aircraft 10 from low speed forward flight in proprotor forward flight mode, as best seen in FIG. 1B, to high speed forward flight in airplane forward flight mode, as best seen in FIG. 1D, transitioning mechanism 200 is used to safely achieve this result. As a preliminary step, engines 24a, 24b are transitioned from turboshaft mode to turbofan mode until forward thrust is solely generated by engines 24a, 24b and tiltrotor aircraft 10 is in non-rotary flight mode. Swash plate 220 is now used to collectively shift the pitch of rotor blade assemblies 212 to the feathering position, as best seen in FIG. 1C, wherein rotor blades 216 act as brakes to aerodynamically stop the rotation of rotor assemblies 202. To disable the gimballing degree of freedom of rotor assembly 202, the gimbal lock is actuated. At the same time, responsive to the actuation of the gimbal lock, arms 242 shift from the bottom position to the top position to provide a positive stop for rotor blade assemblies 212.

Figure 4A:
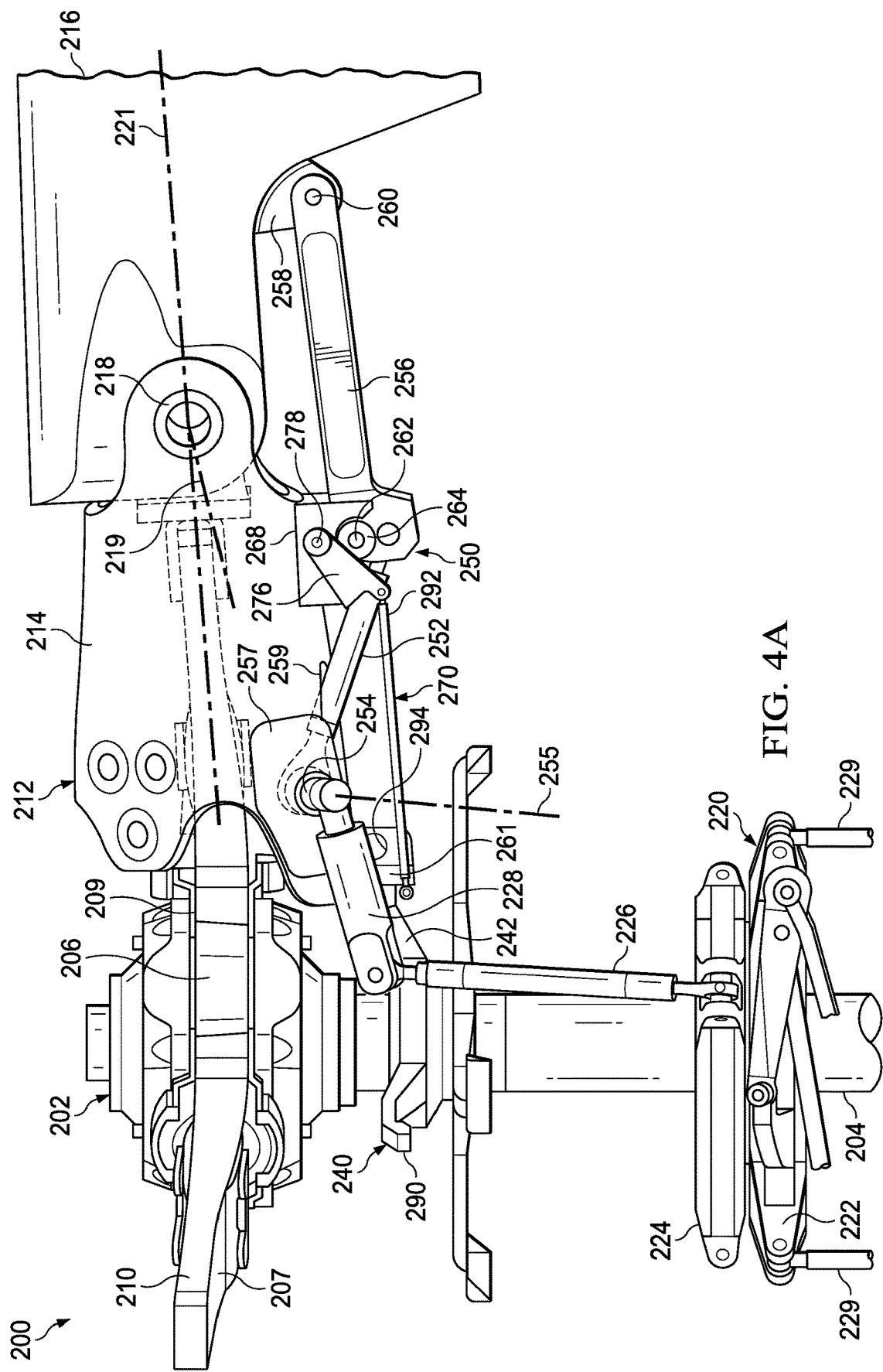
FIGS. 4A-4C are front views of another mechanism for transitioning a tiltrotor aircraft between rotary and non-rotary flight modes, shown in various positions.
Figure 4B:
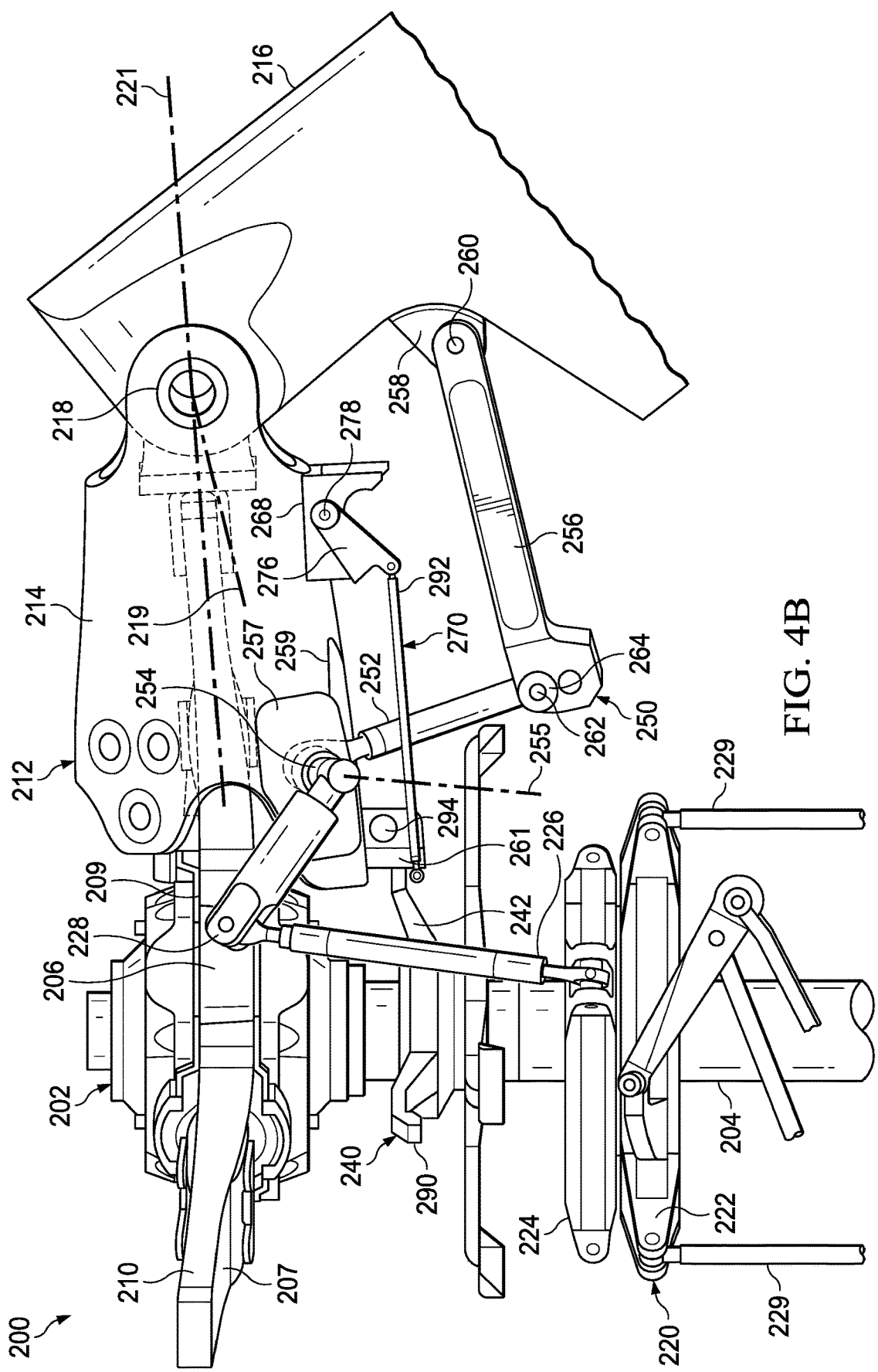
Figure 6A:
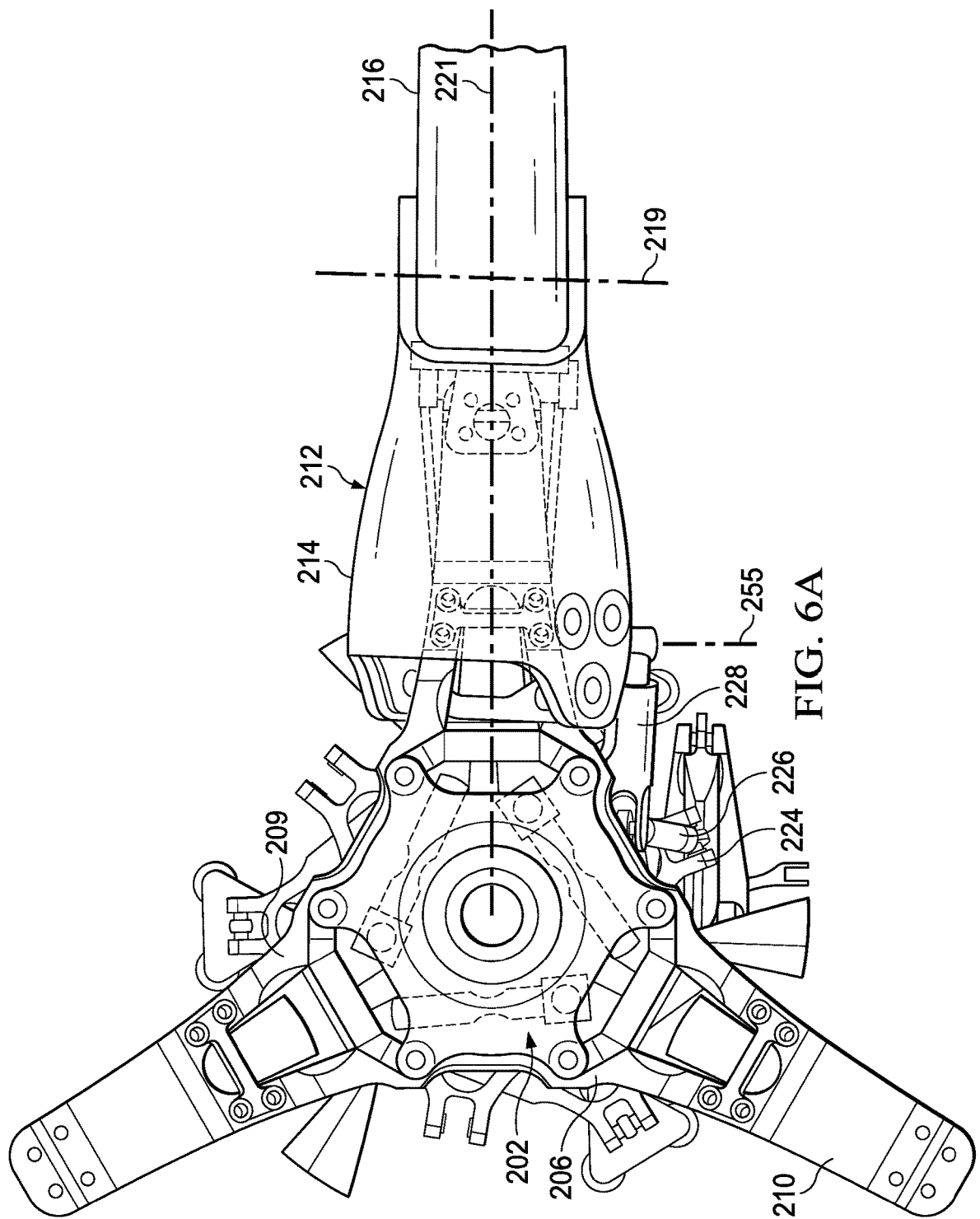
FIGS. 6A-6C are top views of the mechanism of FIGS. 4A-4C transitioning between rotary flight mode and non-rotary flight mode, in various positions.
Figure 6B:
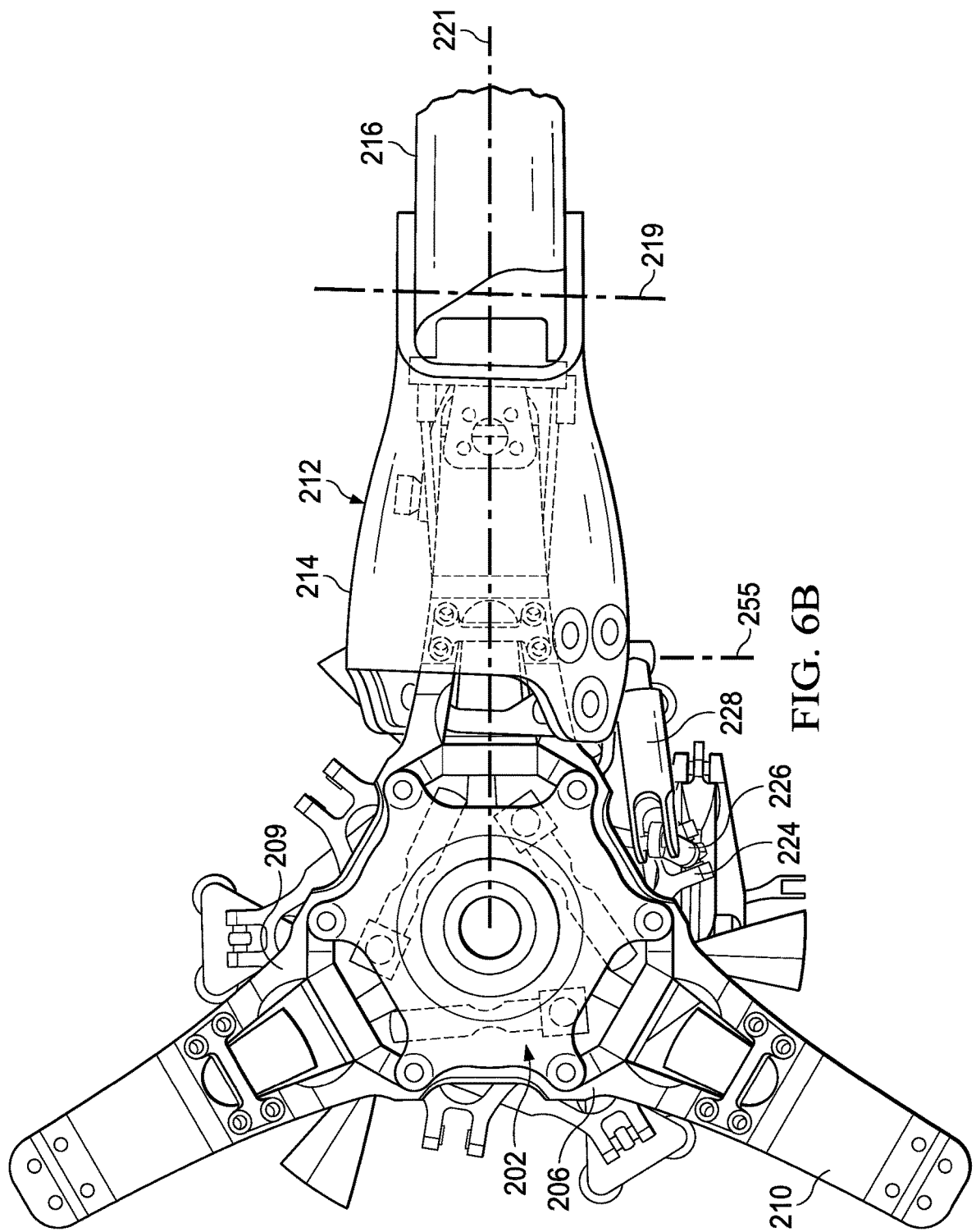
Figure 6C:
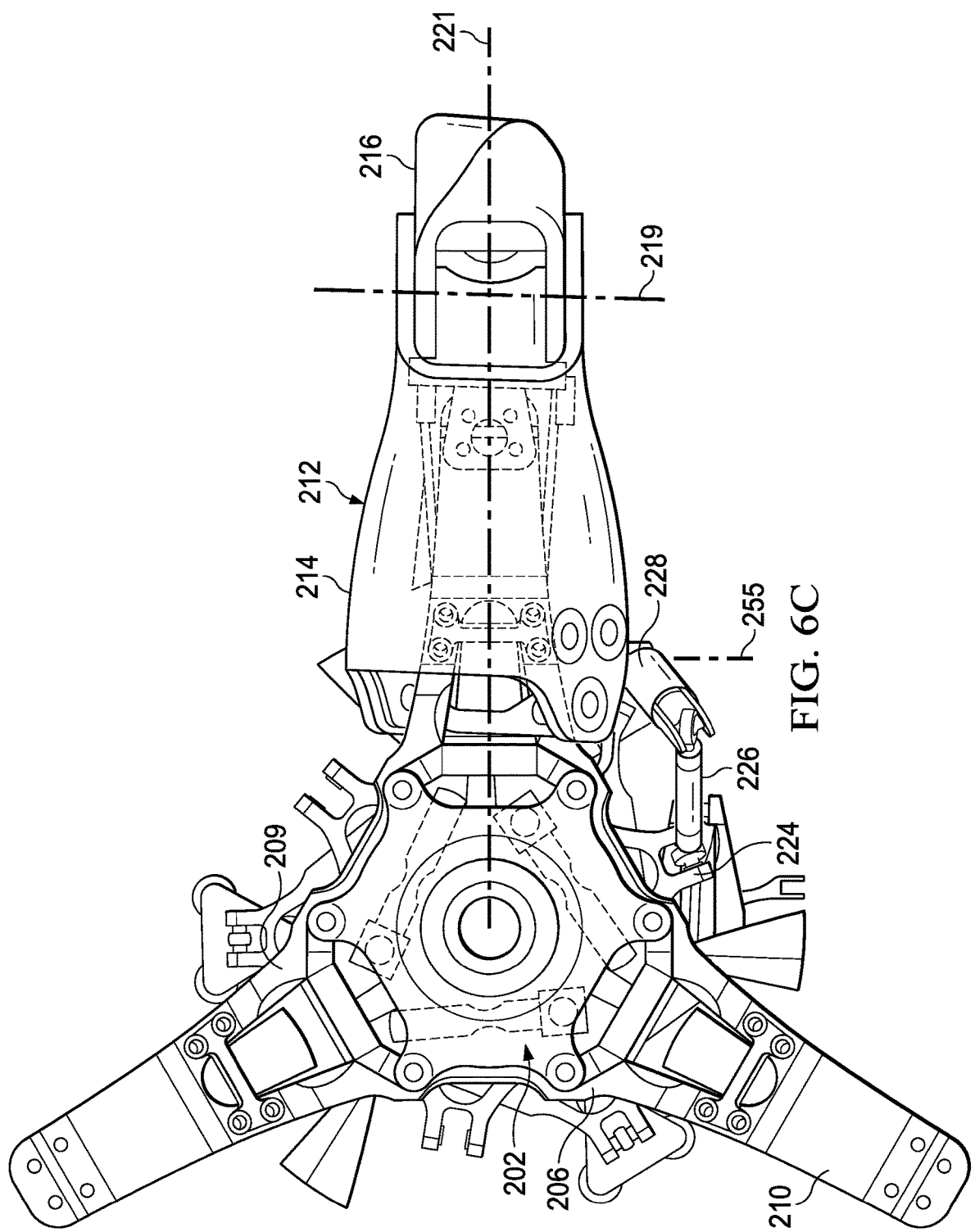

Next, actuators 294 are operated to shift blade locks 270 from the fold lock position to the pitch lock position. Actuator 294 simultaneously causes hasp 282 to rotate relative to plate 261 about the connection member and arms 276 to rotate relative to seats 268 of cuff 214 about pins 278. At the end of travel, hasp 282 has received tab 288 of plate 261 and tab 290 of arm 242 in the central opening, which disables the pitching degree of freedom of rotor blade assemblies 212. Also, at the end of travel, the wedges of arms 276 have cleared the lower portion of flanges 264, which enables the folding degree of freedom of rotor blade assemblies 212. Swash plate 220 is now used to collectively shift rotor blade assemblies 212 from the radially outwardly extending feathering position, as best seen in FIGS. 1C, 4A, and 6A, to a folded orientation, as best seen in FIGS. 1D, 4C, and 6C.

With the pitching degree of freedom disabled, rise and fall of swash plate 220 now commonly rotates pitch horn 228 and crank 252 relative to cuff 214 about crank axis 255. The rotation of crank 252 causes rotation of link 256 relative to lug 258 about pin 260, rotation in pivot joint 262, which disengages flanges 264 from seats 268, and rotation of rotor blade 216 relative to cuff 214 about pin 218 and blade-fold axis 219, as best seen in FIGS. 4B, 5, and 6B. Continued operation of swash plate 220 causes continued rotation of pitch horn 228, crank 252, link 256, and rotor blade 216 until rotor blade 216 reaches its desired folded orientation, as best seen in FIGS. 1D, 4C, and 6C. Tiltrotor aircraft 10 is now in airplane flight mode, which is the high-speed forward flight mode of tiltrotor aircraft 10 and is a non-rotary flight mode. In this operational mode, engines 24a, 24b are in turbofan mode providing no torque and rotational energy to proprotor assemblies 20a, 20b, the gimbal lock is in the engaged position disabling the gimballing degree of freedom of rotor assemblies 202, arms 242 of blade stop assembly 240 are in the top position providing a positive stop and coupling for rotor blade assemblies 212, and each of the blade lock assemblies 250 is disabling the pitching degree of freedom and enabling the folding degree of freedom of rotor blade assemblies 212.

When it is desired to transition back to proprotor forward flight mode, as best seen in FIG. 1B, from airplane forward flight mode, as best seen in FIG. 1D, transitioning mechanism 200 is used to safely achieve this result. With the pitching degree of freedom disabled, lowering swash plate 220 commonly rotates pitch horn 228 and crank 252 relative to cuff 214 about crank axis 255, which in turn causes rotation link 256 and the unfolding of rotor blade 216, as best seen in FIGS. 4B, 5, and 6B. Continued operation of swash plate 220 causes continued rotation of pitch horn 228, crank 252, link 256, and rotor blade 216 until rotor blade 216 reaches its desired radially outwardly extending orientation, as best seen in FIGS. 1C, 4C and 6C. In this position, crank 252 and link 256 are extended such that flanges 264 have entered seats 268, as best seen in FIG. 4A.

Next, actuators 294 are operated to shift blade locks 270 from the pitch lock position to the fold lock position. Actuator 294 simultaneously causes hasp 282 to rotate relative to plate 261 and arms 276 to rotate relative to seats 268 of cuff 214 about pins 278. At the end of travel, hasp 282 is remote from tab 288 of plate 261 and tab 290 of arm 242, which enables the pitching degree of freedom of rotor blade assemblies 212 about pitch-change axis 221. Also, at the end of travel, the wedges of arms 276 have contacted roller elements 266, seating flanges 264 tightly within seats 268 and disabling the folding degree of freedom of rotor blade assembly 212. Swash plate 220 may now be used to collectively shift rotor blade assemblies 212 from the feathering position, as best seen in FIG. 1C, to a windmilling orientation.

To enable the gimballing degree of freedom of rotor assembly 202, the gimbal lock is lowered. At the same time, arms 242 shift from the top position to the bottom position, to provide clearance for rotor blade assemblies 212. Next, engines 24a, 24b are transitioned from turbofan mode to turboshaft mode such that forward thrust is provided by proprotor assemblies 20a, 20b and tiltrotor aircraft 10 is in the rotary flight mode. From this configuration, tiltrotor aircraft 10 may now be transitioned to helicopter mode when it is desired to hover and/or land the aircraft.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A mechanism for transitioning a rotor blade between an extended position and a folded position, wherein the rotor blade is rotatably coupled to a blade cuff about a blade-fold axis, the mechanism comprising:
   a swash plate configured to translate relative to a mast;
   a pitch link rotatably coupled to the swash plate;
   a pitch horn rotatably coupled to the pitch link;
   a crank coupled to the pitch horn, the pitch horn and the crank being configured to commonly rotate relative to the blade cuff, about a crank axis, in response to translation of the swash plate, the crank axis passing through the blade cuff; and
   a link rotatably coupled to the crank and rotatably coupled to the rotor blade.

2. The mechanism of claim 1, wherein at least a portion of the crank is located within a volume of the blade cuff.

3. The mechanism of claim 2, wherein the mechanism is configured to cause the rotor blade to rotate greater than 90 degrees while the pitch horn rotates less than 90 degrees.

4. The mechanism of claim 3, further comprising:
   a blade lock having a locked position and an unlocked position, the blade lock being configured to lock the pitch horn in a fixed position relative to the blade cuff in the locked position, wherein translation of the swash plate is configured to cause rotation of the rotor blade about a pitch-change axis when the blade lock is in the locked position.

5. The mechanism of claim 4, wherein the crank axis and the blade-fold axis are skew.

6. The mechanism of claim 5, wherein at least a portion of the pitch horn is configured to extend above a lower surface of a rotor hub when the rotor blade is in the folded position.

7. The mechanism of claim 6, wherein the at least a portion of the pitch horn is configured to extend above an upper surface of the rotor hub when the rotor blade is in the folded position.

8. A mechanism for transitioning a rotor blade between an extended position and a folded position, wherein the rotor blade is rotatably coupled to a blade cuff about a blade-fold axis, the mechanism comprising:
   a swash plate configured to translate relative to a mast;
   a pitch link rotatably coupled to the swash plate;
   a pitch horn rotatably coupled to the pitch link;
   a crank coupled to the pitch horn, the pitch horn and the crank being configured to commonly rotate relative to the blade cuff, about a crank axis, in response to translation of the swash plate, the crank axis and the blade-fold axis being skew; and
   a link rotatably coupled to the crank and rotatably coupled to the rotor blade;
   wherein the mechanism is configured to cause the rotor blade to rotate greater than 90 degrees while the pitch horn rotates less than 90 degrees.

9. The mechanism of claim 8, further comprising:
   a blade lock having a locked position and an unlocked position, the blade lock being configured to lock the link in a fixed relationship relative to the blade cuff in the locked position.

10. The mechanism of claim 9, wherein the crank axis passes through the blade cuff.

11. The mechanism of claim 10, wherein at least a portion of the crank is located within a volume of the blade cuff.

12. The mechanism of claim 11, wherein at least a portion of the pitch horn is configured to extend above a lower surface of a rotor hub when the rotor blade is in the folded position.

13. The mechanism of claim 12, wherein the at least a portion of the pitch horn is configured to extend above an upper surface of the rotor hub when the rotor blade is in the folded position.

14. A tiltrotor aircraft, comprising:
   a mast;
   a rotor assembly, comprising:
      a rotor hub having an arm; and
      a rotor blade assembly being rotatably coupled to the arm about a pitch-change axis, the rotor blade assembly including a blade cuff and a rotor blade, the rotor blade being rotatably coupled to the blade cuff about a blade-fold axis; and
   a blade folding mechanism, comprising:
      a swash plate being configured to translate relative to the mast;
      a pitch link rotatably coupled to the swash plate;
      a pitch horn rotatably coupled to the pitch link;
      a crank coupled to the pitch horn, the pitch horn and the crank being configured to commonly rotate relative to the blade cuff, about a crank axis, in response to translation of the swash plate, the crank axis and the blade-fold axis being skew;
      a link rotatably coupled to the crank and rotatably coupled to the rotor blade; and
      a blade lock having a locked position and an unlocked position, the blade lock being configured to lock the pitch horn in a fixed position relative to the blade cuff in the locked position, wherein translation of the swash plate is configured to cause rotation of the rotor blade assembly about the pitch-change axis when the blade lock is in the locked position;
      wherein the crank axis passes through the blade cuff.

15. The tiltrotor aircraft of claim 14, wherein the blade folding mechanism is configured to cause the rotor blade to rotate greater than 90 degrees while the pitch horn rotates less than 90 degrees, when the blade lock is in the unlocked position.

16. The tiltrotor aircraft of claim 15, wherein at least a portion of the crank is located within a volume of the blade cuff.

17. The tiltrotor aircraft of claim 16, wherein at least a portion of the pitch horn is configured to extend above an upper surface of the rotor hub when the rotor blade is in a folded position.

* * * * *